US012614030B2

(12) United States Patent
Somech et al.

(10) Patent No.: US 12,614,030 B2
(45) Date of Patent: Apr. 28, 2026

(54) ENRICHING LANGUAGE MODEL INPUT WITH CONTEXTUAL DATA

(71) Applicant: Microsoft Technology Licensing, LLC, Redmond, WA (US)

(72) Inventors: Haim Somech, Ramat Gan (IL); Adi L. Miller, Ramat Hasharon (IL); Assaf Avihoo, Matan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 18/328,610

(22) Filed: Jun. 2, 2023

(65) Prior Publication Data

US 2024/0311563 A1     Sep. 19, 2024

Related U.S. Application Data

(60) Provisional application No. 63/490,696, filed on Mar. 16, 2023.

(51) Int. Cl.
*G06F 40/279*     (2020.01)
*G06N 20/00*     (2019.01)

(52) U.S. Cl.
CPC ........... *G06F 40/279* (2020.01); *G06N 20/00* (2019.01)

(58) Field of Classification Search
None
See application file for complete search history.

(56) References Cited

U.S. PATENT DOCUMENTS

| 11,521,200 B1 | 12/2022 | Khan | |
| 2021/0034663 A1* | 2/2021 | Aher | G06F 16/635 |
| 2021/0182489 A1 | 6/2021 | Barkan et al. | |
| 2022/0036153 A1 | 2/2022 | O'malia et al. | |
| 2022/0207321 A1 | 6/2022 | Gulati et al. | |
| 2022/0270597 A1 | 8/2022 | Qiu et al. | |
| 2022/0358908 A1 | 11/2022 | Gandhe et al. | |
| 2023/0014775 A1* | 1/2023 | Dotan-Cohen | H04L 51/046 |
| 2023/0334231 A1* | 10/2023 | Shahgoshtasbi | G06F 16/345 |

FOREIGN PATENT DOCUMENTS

JP     2021089432 A     6/2021

OTHER PUBLICATIONS

18328610_2025-06-09_CN_114625851_A_M translation.pdf (Year: 2022).*
Yu, et al., "Generate Rather than Retrieve: Large Language Models are Strong Context Generators", In Repository of arXiv:2209. 10063v2, Sep. 29, 2022, pp. 1-22.

* cited by examiner

*Primary Examiner* — Paras D Shah
*Assistant Examiner* — Ali M Hassan

(57)     ABSTRACT

Various embodiments discussed herein are directed to improving existing technologies by providing a corpus data supplement as input into a model, such as a Large Language Model (LLM). Consequently, the model can generate accurate scores or data for predictions because the model is better able to distinguish between a general understanding of natural language concepts and domain-specific concepts.

20 Claims, 11 Drawing Sheets

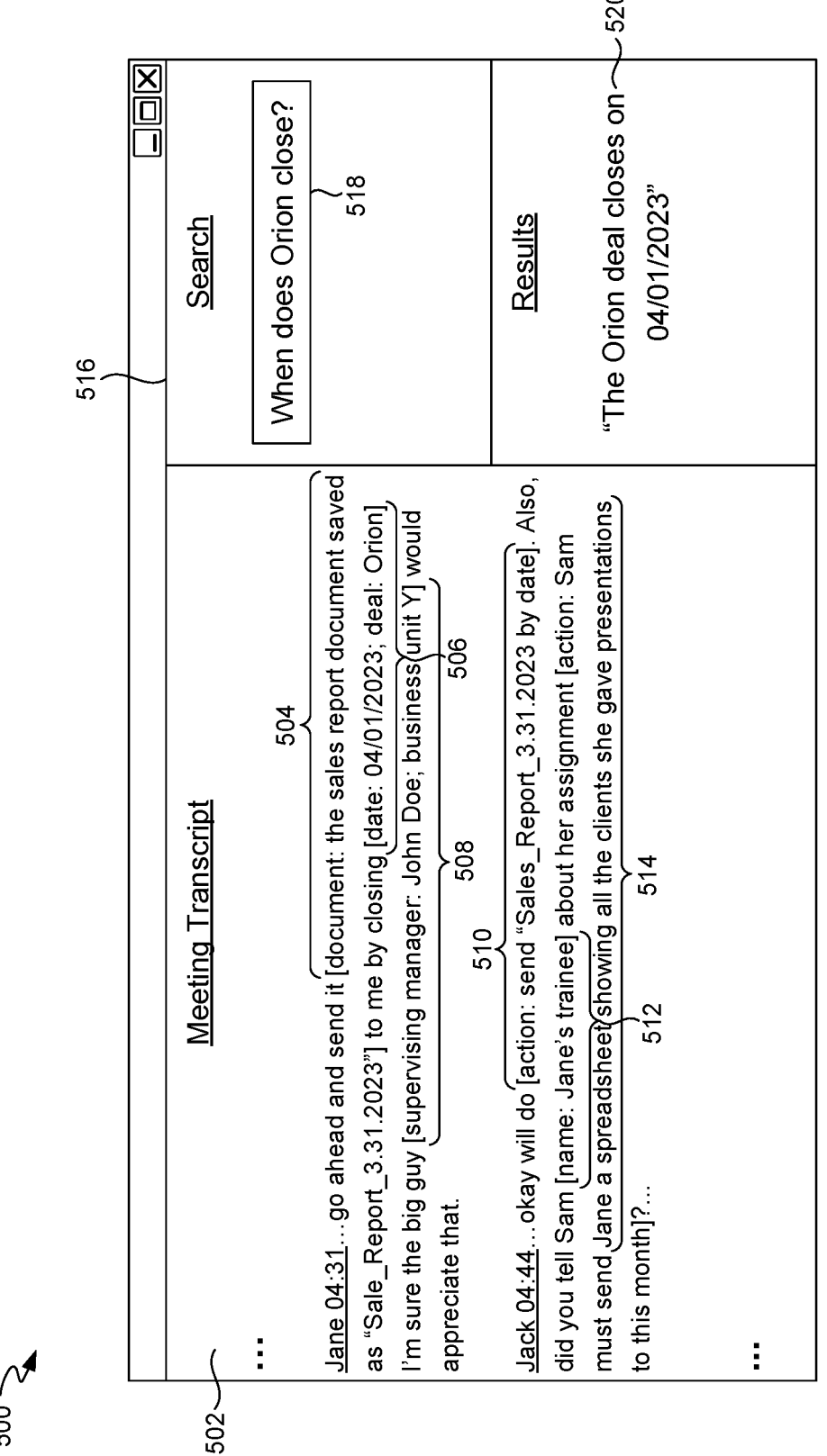

500

502

Meeting Transcript
504

...

Jane 04:31...go ahead and send it [document: the sales report document saved as "Sale_Report_3.31.2023"] to me by closing [date: 04/01/2023; deal: Orion] I'm sure the big guy [supervising manager: John Doe; business:(unit Y)] would appreciate that.

506

508

510

Jack 04:44...okay will do [action: send "Sales_Report_3.31.2023 by date]. Also, did you tell Sam [name: Jane's trainee] about her assignment [action: Sam must send Jane a spreadsheet(showing all the clients she gave presentations) to this month]?...

512

514

...

516

Search

When does Orion close?

518

Results

"The Orion deal closes on 04/01/2023"

RECEIVE A CORPUS OF TEXT ~ 702

DETERMINE CONTEXTUAL DATA ASSOCIATED WITH THE CORPUS OF TEXT ~ 704

BASED ON THE CONTEXTUAL DATA, DETERMINE A CORPUS DATA SUPPLEMENT ~ 706

BASED ON THE DETERMINING OF THE CORPUS DATA SUPPLEMENT, PROVIDE THE CORPUS OF TEXT AND THE CORPUS DATA SUPPLEMENT AS INPUT INTO A MACHINE LEARNING MODEL ~ 708

800

DETECT AN ENTITY BY SCANNING A
CORPUS OF TEXT    ~ 803

CLASSIFY AN ENTITY TYPE OF THE ENTITY    ~ 805

BASED ON THE ENTITY TYPE, DETERMINE
ENTITY ENRICHMENT DATA FOR THE ENTITY
USING CONTEXTUAL DATA    ~ 807

ADD THE ENTITY (OR ASSOCIATE) ENRICHMENT
DATA WITH THE ENTITY (OR THE CORPUS OF TEXT)
AS A CORPUS DATA SUPPLEMENT    ~ 809

900

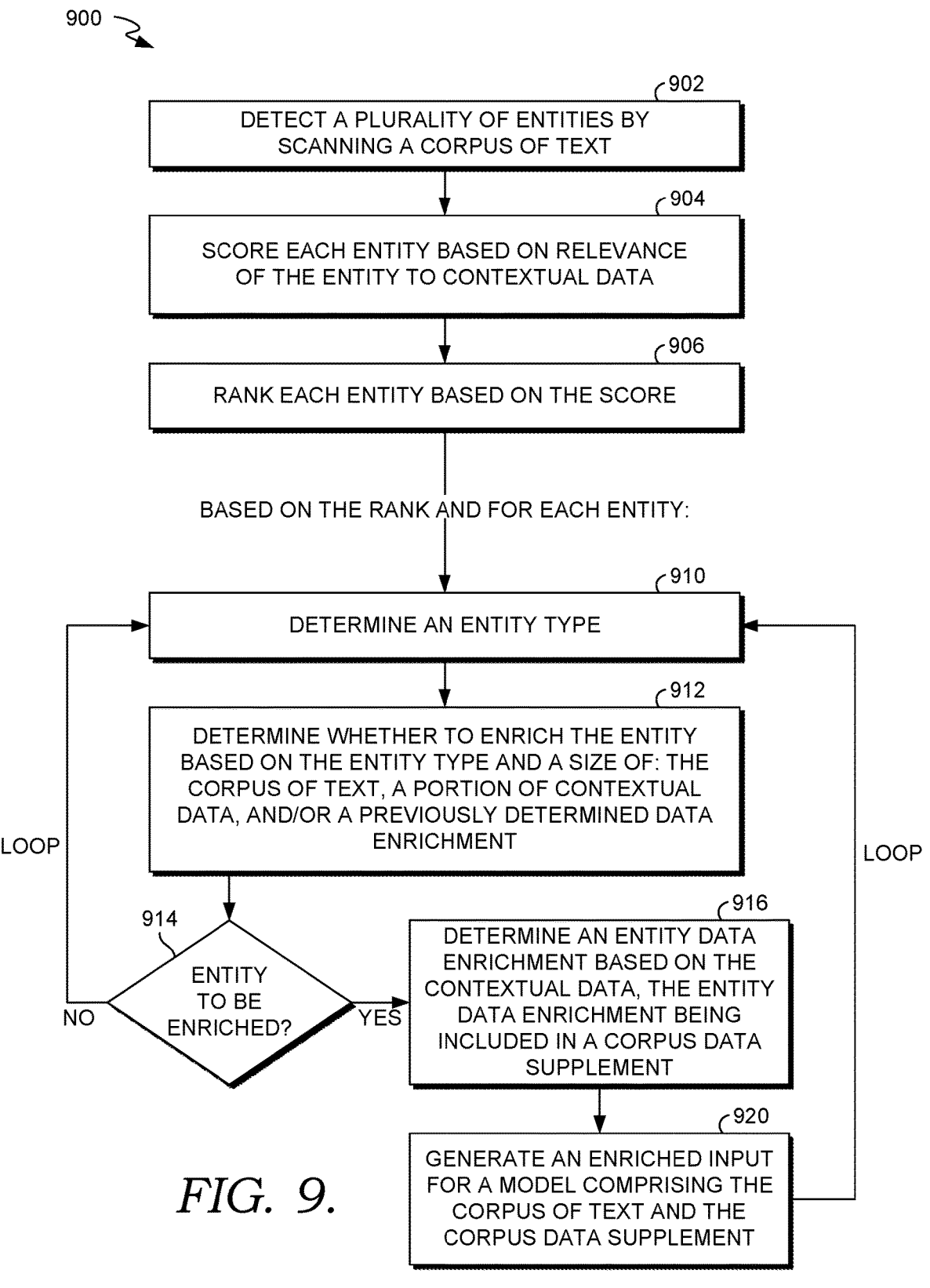

902

DETECT A PLURALITY OF ENTITIES BY
SCANNING A CORPUS OF TEXT

904

SCORE EACH ENTITY BASED ON RELEVANCE
OF THE ENTITY TO CONTEXTUAL DATA

906

RANK EACH ENTITY BASED ON THE SCORE

BASED ON THE RANK AND FOR EACH ENTITY:

910

DETERMINE AN ENTITY TYPE

912

DETERMINE WHETHER TO ENRICH THE ENTITY
BASED ON THE ENTITY TYPE AND A SIZE OF: THE
CORPUS OF TEXT, A PORTION OF CONTEXTUAL
DATA, AND/OR A PREVIOUSLY DETERMINED DATA
ENRICHMENT

LOOP

LOOP

914

ENTITY
TO BE
ENRICHED?

NO

YES

916

DETERMINE AN ENTITY DATA
ENRICHMENT BASED ON THE
CONTEXTUAL DATA, THE ENTITY
DATA ENRICHMENT BEING
INCLUDED IN A CORPUS DATA
SUPPLEMENT

920

GENERATE AN ENRICHED INPUT
FOR A MODEL COMPRISING THE
CORPUS OF TEXT AND THE
CORPUS DATA SUPPLEMENT

*FIG. 9.*

ENRICHING LANGUAGE MODEL INPUT WITH CONTEXTUAL DATA

BACKGROUND

Computational linguistics, also known as Natural Language Processing (NLP), is a computer-based technique to understand, learn, and/or produce natural human language content. Recent advances in NLP technologies use sophisticated machine learning models or other techniques to derive a rich understanding of linguistics. For example, some models: engage in preprocessing pipelines via Part-of-Speech (POS) tagging (with tags such as noun, verb, and preposition), tokenize and parse sentences into their grammatical structures, perform lemmatization, stemming, and the like for syntactic, semantic, or sentiment analysis.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein are directed to providing a corpus data supplement (e.g., selected contextual data or metadata) as input into a model, such as a Large Language Model (LLM). Consequently, the model can generate accurate scores or data for predictions because the model is better able to distinguish between a general understanding of natural language concepts and domain-specific (e.g., organizational) concepts. For example, "Red Sea" may be the name of an organization's project. A user may issue a query, such as "when is Red Sea due?" The model will interpret "Red Sea" to be an organization project name because a tag is embedded in a written meeting transcript next to the words "Red Sea," where the tag reads "[project name: business unit X],"—the corpus data supplement. Such tag indicates that the term Red Sea corresponds to a specific project name entity, as opposed to a body of water entity. Accordingly, the model will ingest the meeting transcript with the tag as input to produce an accurate result or answer, such as "Red Sea is due on Mar. 2 2023." Such prediction produces a due date that indicates its correct understanding of Red Sea as a project, instead of a body of water.

Various embodiments improve existing technologies and have various technical effects. Existing technologies are incomplete or inaccurate in making model predictions. They also unnecessary consume various computing resources, such as computer memory, CPU, and computer input/output (I/O). However, various embodiments of the present disclosure have the technical effects of improving the accuracy and the consumption of computing resources, as well as other technical effects, as described herein.

BRIEF DESCRIPTION OF THE DRAWINGS

The present invention is described in detail below with reference to the attached drawing figures, wherein:

FIG. 5 is a screenshot of an example user interface for returning search results of a query based on reading a meeting transcript that includes various corpus data supplements, according to some embodiments;

FIG. 9 is a flow diagram of an example process for generating a corpus data supplement, according to some embodiments;

DETAILED DESCRIPTION

Figure 1:
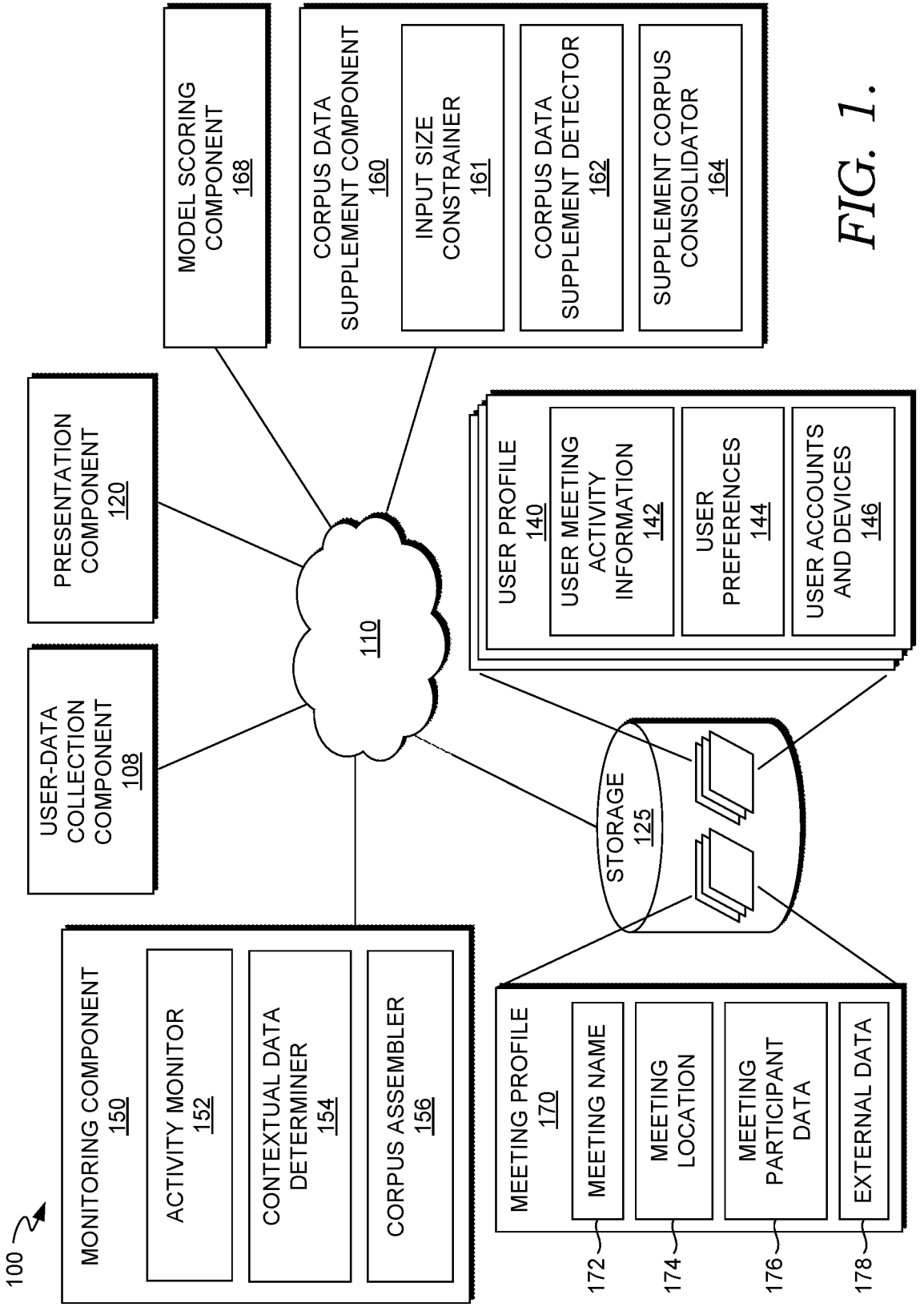
FIG. 1 is a block diagram depicting an example computing architecture suitable for implementing some embodiments of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

Existing NLP-based technologies are incomplete or inaccurate. One reason is because existing language models, such as Large Language Models (LLM), often make predictions without adequate contextual data. For example, when a user asks a question or otherwise provides a query to a model, and the model does not know the context of the question, it provides an answer that is inaccurate or may not provide an answer at all. In an illustrative example, "Red Sea" may be the name of a company's project. A user may issue a question, such as "when is Red Sea due?" In many cases, the model will interpret "Red Sea" to be a body of water instead of a company project name because the model is only pre-trained to generically understand human natural language and/or fine-tuned on geography resources without providing the model any other context. Accordingly, the model may produce an inaccurate result or prediction, such as "Eritrea, on the coast of the Red Sea, boasts an average dew point of 84 degrees." Instead of correctly producing a due date that indicates its understanding of Red Sea as a project, the model produces a result of a dew point based on incorrectly understanding Red Sea to be a body of water.

Existing NLP-based technologies also consume an unnecessary quantity of computing resources, such as computer memory and CPU. This is because models, such as LLMS, have to be trained and fine-tuned on millions of resources (e.g., books, dictionaries, etc.), where billions of parameters (e.g., weights, coefficients) and hyperparameters (e.g., choice of loss function and number of hidden layers) must be implemented to initiate or complete training and fine-tuning. This trend towards larger models raises several concerns. First is the cost of exponentially scaling these models' computational requirements. Second, these large models require extensive computational and memory requirements. This is because these parameters must be stored in memory and analyzed at runtime, training, fine-tuning, and testing to make predictions, making the overhead extensive. Lastly, there are efficiency costs with training and fine-tuning existing models. That is, these models take a vast amount of time to train, fine-tune, test, and eventually deploy in a production environment. This is because most parameters are learned from scratch, taking many epochs and training sessions.

Various embodiments of the present disclosure provide one or more technical solutions that have technical effects in light of these technical problems, as well as other problems, as described herein. In operation, some embodiments are directed to providing a corpus of text (e.g., a written document) and a corpus data supplement (e.g., metadata) as input into a machine learning model, such as an LLM. Consequently, the machine learning model can generate appropriate scores or data for predictions, such as answers to user questions, sentiment analysis, automatic summarization, text generation, machine translation, or document classification, among other use cases.

In an illustrative example, various embodiments first receive a corpus of text, such as a written meeting transcript that includes natural language characters indicating content spoken in a meeting. Some embodiments then determine contextual data associated with the corpus of text. For example, some embodiments determine metadata associated with the meeting, such as attendees of the meeting, date of the meeting, and agenda associated with the meeting by scanning emails, attachments, chats, SMS messages, or the like.

Based on the contextual data, some embodiments then determine a corpus data supplement. In some embodiments, a "corpus data supplement" is data to be added within the corpus of text as input into a model. For example, a corpus data supplement can be a tag or other data structure that includes metadata associated with particular words within the written meeting transcript. For example, an original or raw meeting transcript may say, "let's get Red Sea done by tomorrow." A modified meeting transcript with the corpus data supplement may read, "let's get Red Sea [project name: business unit X] done by tomorrow," where the corpus data supplement is "[project name: business unit X]." Additionally or alternatively, in some embodiments, a "corpus data supplement" is data that supplements the corpus of text as input into the machine learning model. In some of these embodiments, the corpus data supplement is separate from the corpus of text and not included within any part of the corpus of text. For example, instead of embedding the tag within the corpus of text as illustrated above, the information in the tag may be provided as a separate document. For example, an entirety of a separate email (which may include additional natural language characters other than the tag information) may be provided, along with the meeting transcript (for example, the corpus of text) as input in the machine learning model. In another embodiment, the corpus data supplement is appended to the corpus of text, such as at the end of the corpus of text. For example, a company organization document may be appended to a corpus of text that is a meeting transcript. In this way, the model has adequate contextual data to make accurate predictions.

Particular embodiments have the technical effect of improved accuracy scores or predictions (e.g., a confidence level answer, a clustering score, a classifier score, or generative text) relative to existing technologies and models. Unlike existing technologies, particular embodiments make predictions with adequate context because a corpus data supplement is used as input into the machine learning model. Using the illustrative example above, "Red Sea" may be the name of a company's project. A user may issue a query, such as "when is Red Sea due?" The model will interpret "Red Sea" to be a company project because, for example, the term "Red Sea" is accompanied with a tag that reads "[project name: business unit X]," which is a corpus data supplement. Accordingly, the model will produce an accurate result or prediction, such as "Red Sea is due on Mar. 2 2023." Such prediction correctly produces a due date that indicates its correct understanding of Red Sea as a project, instead of a body of water. In other words, embodiments provide a more relevant or richer input to the model so that the context of the query is clear and the model takes into account the context to return the results. Accordingly, one technical solution is determining contextual data associated with the corpus of text because the corpus data supplement is determined based on the contextual data. Another technical solution is the actual determining of the corpus data supplement (or providing of the corpus data supplement as input) because it is data that is used as input into a machine learning model, thereby making predictions more accurate.

Particular embodiments also have the technical effect of improving computing resource consumption, such as computer memory and latency. This is because various embodiments are not fine-tuned (or do not need to rely on fine-tuning) for accurate predictions. Fine-tuning is the process of re-training a pre-trained model on a new dataset without training from scratch. Fine-tuning typically takes weights of a trained model and uses those weights as the initialization value, which then gets adjusted during fine-tuning based on the new dataset Particular embodiments do not need to engage in fine-tuning by ingesting millions of additional data sources and billions of parameters and hyperparameters. Thus the models of these embodiments are significantly more condensed. This means that the cost of scaling these models' computational requirements are significantly lower. The models of these embodiments do not require as much computational and memory requirements because there is no need to access the billions of parameters, hyperparameters, or additional resources in the fine-tuning phase. As described above, all of these parameters and resources must typically be stored in memory and analyzed at runtime and fine-tuning to make predictions, making the overhead extensive and unnecessary. Lastly, various embodiments take significantly less time to train and eventually deploy in a production environment because the model need only be pre-trained and not fine-tuned. In effect, the corpus data supplement acts as a proxy or otherwise can replace fine-tuning. Accordingly, one technical solution is that embodiments can be pre-trained without having been fine-tuned. Another technical solution is the providing the corpus data supplement as input into the machine learning model because the corpus data supplement is a proxy to fine-tuning. Each of these technical solutions has the technical effect of improving computing resource consumption, such as computer memory and latency because not as much data (e.g., parameters) is stored or used for producing predictions.

Another technical solution is receiving or determining an input size constraint of a model and determining the corpus data supplement based on the input size constraint (e.g., reducing the tags to X token threshold). Certain models, such as LLMs, are constrained on data input size due to computational expenses associated with processing those inputs. This technical solution has the technical effect of improving computing resource consumption, such as computer memory and latency because not as much contextual data or corpus data supplement is stored or used as input for producing predictions.

Another technical solution is adding or embedding a corpus data supplement within the corpus of text itself, such as via a tag. The technical effect is the reduction of computer input/output (I/O), which places less wear and tear on a read/write head or other I/O device. Reaching out to disk, for example, is very expensive because of the address location identification time and mechanical movements required of a read/write head, which is error prone if done too many times. These embodiments reduce I/O because instead of reaching out multiple times across a network to access different sets of contextual data and the corpus of text, particular embodiments only perform a single read (or fewer reads) at the corpus of text, which already includes the contextual data necessary. For example, a corpus of text, such as a meeting transcript, may include a tag that includes summarized contents of an email. Accordingly, instead of reading both the meeting transcript and the email via accessing a separate emailing platform as part of two separate I/O operations, particular embodiments only perform a single read of the meeting transcript because the meeting transcript already contains the relevant email information, thereby reducing I/O, which is less error prone and places less wear and tear on a read/write head.

Turning now to FIG. 1, a block diagram is provided showing aspects of an example computing system architecture suitable for implementing some embodiments of the disclosure and designated generally as system 100. The system 100 represents only one example of a suitable computing system architecture. Other arrangements and elements can be used in addition to or instead of those shown, and some elements may be omitted altogether for the sake of clarity. Further, as with system 100, many of the elements described herein are functional entities that are implemented as discrete or distributed components or in conjunction with other components, and in any suitable combination and location according to various embodiments.

Example system 100 includes network(s) 110, which is described in connection to FIG. 10, and which communicatively couples components of system 100 including a corpus assembler 157, a monitoring component 150, a user-data collection component 108, a presentation component 120, a corpus data supplement component 160, a model scoring component 168, and storage 125. The system 100 is generally responsible for providing a corpus of text and a corpus data supplement as input into a model, such as a Large Language Model (LLM). In some embodiments, these components are embodied as a set of compiled computer instructions or functions, program modules, computer software services, or an arrangement of processes carried out on one or more computer systems, such as computing device 11 described in connection to FIG. 11, and the user device 02a and/or the server 06 of FIG. 10, for example.

In some embodiments, the functions performed by components of system 100 are associated with one or more personal assistant applications, services, or routines. In particular, such applications, services, or routines can operate on one or more user devices (such as user device 02a of FIG. 10), servers (such as server 06 of FIG. 10), can be distributed across one or more user devices and servers, or be implemented in the cloud. Moreover, in some embodiments, these components of system 100 are distributed across a network, including one or more servers (such as server 06 of FIG. 10) and client devices (such as user device 02a of FIG. 10), in the cloud, or reside on a user device, such as user device 02a of FIG. 10. Moreover, these components, functions performed by these components, or services carried out by these components are implemented at appropriate abstraction layer(s) such as the operating system layer, application layer, and/or hardware layer of the computing system(s). Alternatively, or in addition, in some embodiments, the functionality of these components and/or the embodiments described herein are performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs). Additionally, although functionality is described herein with regards to specific components shown in example system 100, it is contemplated that in some embodiments functionality of these components are shared or distributed across other components.

Continuing with FIG. 1, the corpus assembler 156 is generally responsible for receiving or generating a corpus of text, such as a document, a file, a chat message, a SMS text, or written audio transcription. In some embodiments, the corpus assembler 156 is responsible for detecting one or more natural language utterances from one or more attendees of a meeting or other event. For example, in some embodiments, a processor executing the corpus assembler 156 detects natural language via a speech-to-text service. For example, an activated microphone at a user device can pick up or capture near-real time utterances of a user and the user device may transmit, over the network(s) 110, the speech data to a speech-to-text service that encodes or converts the audio speech to text data (the corpus of text) using natural language processing. In another example, the corpus assembler can detect natural language utterances (such as chat messages) via natural language processing (NLP) only via, for example, parsing each word, tokenizing each word, tagging each word with a Part-of-Speech (POS) tag, and/or the like to determine the syntactic or semantic context. In these embodiments, the corpus of text may not arise from audio data, but may be written natural language utterances, such as chat messages.

In some embodiments, the corpus assembler 156 generates an enriched meeting-activity timeline within the corpus of text. In some embodiments, this timeline is included in a transcript document that includes tags and/or other associated content. For example, the timeline can include structured data (such as a database) that includes records, where each record includes the timeline of each conversation or natural language utterance and a timestamp indicating when the natural language utterance started/stopped.

In some embodiments, the corpus assembler 156 detects natural language utterances using speech recognition or voice recognition functionality via one or more models and then responsively generates a corpus of text. For example, the corpus assembler 156 can use one or more models, such as a Hidden Markov Model (HMM), Gaussian Mixture Model (GMM), Long Short Term Memory (LSTM), and/or or other sequencing or natural language processing model to detect natural language utterances and make attributions to given attendees (e.g., generate a transcript indicating that John H. is speaking). For example, an HMM can learn one or more voice patterns of specific attendees. For instance, HMM can determine a pattern in the amplitude, frequency, and/or wavelength values for particular tones of one or more voice utterances (such as phenomes) that a user has made. In some embodiments, the inputs used by these one or more models include voice input samples, as collected by the user-data collection component 108. For example, the one or more models can receive historical telephone calls, smart speaker utterances, video conference auditory data, and/or any sample of a particular user's voice. In various instances, these voice input samples are pre-labeled or classified as the particular user's voice before training in supervised machine learning contexts. In this way, certain weights associated with certain features of the user's voice can be learned and associated with a user in order to attribute a particular voice to a particular person and make such indication in a meeting transcript.

Continuing with FIG. 1, the user-data collection component 108 is generally responsible for accessing or receiving (and in some cases also identifying) user data from one or more data sources, such as storage 125, which is used by the contextual data determiner 154. In some embodiments, user-data collection component 108 may be employed to facilitate the accumulation of user data of a particular user (or in some cases, a plurality of users including crowd-sourced data) for the monitoring component 150. The data may be received (or accessed), and optionally accumulated, reformatted, and/or combined, by user-data collection component 108 and stored in one or more data stores such as storage 125, where it may be available to other components of system 100. For example, the user data may be stored in or associated with a user profile 140, as described herein. In some embodiments, any personally identifying data (i.e., user data that specifically identifies particular users) is either not uploaded or otherwise provided from the one or more data sources with user data, is not permanently stored, and/or is not made available to the components or subcomponents of system 100. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 108 may be determined via one or more sensors, which may be on or associated with one or more user devices (such as user device 02*a*), servers (such as server 06), and/or other computing devices. As used herein, a sensor may include a function, routine, component, or combination thereof for sensing, detecting, or otherwise obtaining information such as user data from a data source 04*a*, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, GPS data, vehicle signal data, traffic data, weather data (including forecasts), wearable device data, other user device data (which may include device settings, profiles, network-related information (such as network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

User data can be received by user-data collection component 108 from one or more sensors and/or computing devices associated with a user. While it is contemplated that the user data may be processed, for example by the sensors or other components not shown, for interpretability by user-data collection component 108, embodiments described herein do not limit the user data to processed data and may include raw data. In some embodiments, user-data collection component 108 or other components of system 100 may determine interpretive data from received user data. Interpretive data corresponds to data utilized by the components of system 100 to interpret user data. For example, interpretive data can be used to provide context to user data, which can support determinations or inferences made by the components or subcomponents of system 100, such as venue information from a location, a text corpus from user speech (i.e., speech-to-text), or aspects of spoken language understanding. Moreover, it is contemplated that for some embodiments, the components or subcomponents of system 100 may use user data and/or user data in combination with interpretive data for carrying out the objectives of the subcomponents described herein.

In some respects, user data may be provided in user-data streams or signals. A "user signal" can be a feed or stream of user data from a corresponding data source. For instance, a user signal could be from a smartphone, a home-sensor device, a smart speaker, a GPS device (for example, location coordinates), a vehicle-sensor device, a wearable device, a user device, a gyroscope sensor, an accelerometer sensor, a calendar service, an email account, a credit card account, or other data source. In some embodiments, user-data collection component 108 receives or accesses user-related data continuously, periodically, as it becomes available, or as needed.

Continuing with FIG. 1, example system 100 includes a monitoring component 150. The monitoring component 150 includes an activity monitor 152, and a contextual data determiner 154. The monitoring component 150 is generally responsible for determining and/or detecting contextual data from data collected by the user-data collection component 108 or other events (e.g., online meetings, in-person meetings, chats, files) and making the features available to the other components of the system 100. For example, such detected activity can be meeting location (for example, as determined by geo-location of user devices), topic of the meeting, invitees of the meeting, attendees of the meeting, whether the meeting is recurring, related deadlines, projects, and the like. In some aspects, the monitoring component 150 determines and provides a set of meeting features (such as described below), for a particular meeting, and for each user associated with the meeting. In some aspects, the meeting may be a past (or historic) meeting or a current meeting. Further, it should be appreciated that the monitoring component 150 may be responsible for monitoring any number of meetings, for example, each online meeting associated with the system 100. Accordingly, the features corresponding to the online meetings determined by the monitoring component 150 may be used to analyze a plurality of meetings and determine corresponding patterns.

In some embodiments, the input into the monitoring component 150 is sensor data and/or user device data of one or more users at an event and/or information from a meeting invite and/or email or other device activity of users at the meeting. In some embodiments, this includes user data collected by the user-data collection component 110 (which can be accessible via the user profile 140).

The activity monitor 152 is generally responsible for monitoring events (such as user activity) via one or more sensors (such as microphones, video), devices, chats, presented content, and the like. In an illustrative example, the activity monitor 152 may monitor user activity (e.g., clicks, scrolls, emails, chats) between when a meeting begins and ends. In some embodiments, the activity monitor 152 monitors user activity information from multiple user devices associated with the user and/or from cloud-based services associated with the user (such as email, calendars, social media, or similar information sources), and which may be used as contextual data associated with transcripts or content of an event. For example, an email may detail conversations between two participants that provide context to a meeting transcript by describing details of the meeting, such as purpose of the meeting. The activity monitor 152 may determine current or near-real-time user activity information and may also determine historical user activity information, in some embodiments, which may be determined based on gathering observations of user activity over time and/or accessing user logs of past activity (such as browsing history, for example). Further, in some embodiments, the activity monitor 152 may determine user activity (which may include historical activity) from other similar users (i.e., crowdsourcing).

In embodiments, the activity monitor 152 may monitor and detect characteristics of the user device, such as device hardware, software such as OS, network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user account(s) and device(s) 144 of user profile 140. In an embodiment, the user devices may be polled, interrogated, or otherwise analyzed to determine contextual data about the devices. This information may be used for determining a label or identification of the device (such as a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

In some embodiments, the activity monitor 152 monitors user data associated with the user devices and other related information on a user device, across multiple computing devices (for example, associated with all participants in a meeting), or in the cloud. Information about the user's devices may be determined from the user data made available via user-data collection component 108 and may be provided to the corpus data supplement component 160, among other components of system 100, to make predictions via the model scoring component 168, as described in more detail below. In some implementations of meeting activity monitor 152, a user device may be identified by detecting and analyzing characteristics of the user device, such as device hardware, software such as OS, network-related characteristics, user accounts accessed via the device, and similar characteristics, as described above. For example, information about a user device may be determined using functionality of many operating systems to provide information about the hardware, OS version, network connection information, installed application, or the like. Similarly, some embodiments of activity monitor 152, or its subcomponents, may determine a device name or identification (device ID) for each device associated with a user.

The contextual data determiner 154 is generally responsible for determining contextual data (also referred to herein as "context") associated with a corpus of text or meeting. In some embodiments, information produced by the activity monitor 152 or data collected by the user-data collection component is provided as input to the contextual data determiner 154 so that the contextual data determiner can determine which information is relevant based on content within the corpus of text. Contextual data may be metadata or other data that is not the actual corpus of text or payload itself, but describes related information. For example, a corpus of text may include a meeting transcript and the selected context may responsively include who is present or invited to a meeting, the topic of the meeting, whether the meeting is recurring or not recurring, the location of the meeting, the date of the meeting, the relationship between other projects or other meetings, information about invited or actual attendees of the meeting (such as company role, whether participants are from the same company, and the like). In some embodiments, the contextual data determiner 154 determines some or all of the information by determining information (such as doing a computer read of) within the user profile 140 or meeting profile 170, as described in more detail below.

The user profile 140 generally refers to data about a specific user or meeting attendee, such as learned information concerning an attendee, personal preferences of attendees, and the like. The user profile 140 includes the user meeting activity information 142, user preferences 144, and/or user accounts and devices 146. User meeting activity information 142 may include indications of when attendees or speakers tend to mention certain phrase or entities that is identified via patterns in prior meetings, how attendees identify certain words or entities, and who they are talking to when they reference the particular words or phrases. For example, a particular attendee may always reference a specific entity (e.g., a project) during the last 5 minutes of a meeting. This information can be used by the corpus data supplement component 160 to determine where to insert a corpus data supplement and what content should be included, as described in more detail below. The user profile 140 may also include how attendees or speakers reference particular entities or concepts. For example, historical meeting events may indicate that a particular user always states "Xt5" to reference the name of the document. This can help the corpus data supplement component 160 determine the intent of the natural language utterance was to refer to a corresponding document.

The user profile 140 can include user preferences 144, which generally include user settings or preferences associated with meeting monitor 150. By way of example and not limitation, such settings may include user preferences about specific meeting (and related information) that the user desires to be explicitly monitored or not monitored or categories of events to be monitored or not monitored, crowdsourcing preferences, such as whether to use crowdsourced information, or whether the user's event information may be shared as crowdsourcing data; preferences about which events consumers may consume the user's event pattern information; and thresholds, and/or notification preferences, as described herein. In some embodiments, user preferences 144 may be or include, for example: a particular user-selected communication channel (for example, SMS text, instant chat, email, video, and the like) for content items to be transmitted through.

User accounts and devices 146 generally refer to device IDs (or other attributes, such as CPU, memory, or type) that belong to a user, as well as account information, such as name, business unit, team members, role, and the like. In some embodiments, role corresponds to meeting attendee company title or other ID. For example, participant role can be or include one or more job titles of an attendee, such as software engineer, marketing director, CEO, CIO, managing software engineer, deputy general counsel, vice president of internal affairs, and the like. In some embodiments, the user profile 140 includes participant roles of each participant in a meeting. Participant role can help determine what information to be included in a corpus data supplement, as described with respect to the corpus data supplement component 160. This is because certain content, such as files, are more likely to be surfaced to an attendee depending on the role of the attendee.

Meeting profile 170 corresponds meeting data and associated metadata (such as collected by the user-data collection component 110). The meeting profile 170 includes meeting name 172, meeting location 174, meeting participant data 176, and external data 178. Meeting name 172 corresponds to the title or topic (or sub-topic) of an event or meeting. Corpus data supplements can be determined based at least in part on the meeting name 172, as described with respect to the corpus data supplement component 160. This is because for certain meetings and the associated subject matter, certain data are more or less likely to be relevant. For example, for a meeting where the topic is the accuracy of a machine learning model, any documents concerning model details, such as providing more test data, reducing error rate, and the like, are more likely to be included in a corpus data supplement than, for instance, a meeting where the topic is sales tactics based on hand gestures and other body language habits.

Meeting location 174 corresponds to the geographical location or type of meeting. For example, Meeting location 174 can indicate the physical address of the meeting or building/room identifier of the meeting location. The meeting location 174 can alternatively or additionally indicate that the meeting is a virtual or online meeting or in-person meeting. The event location 174 can also be a signal for determining corpus data supplements via the corpus data supplement component 160. For example, if a user queries "where is the meeting?" The model can tag a meeting transcript to be ingested as input into a model with the meeting location 174. This is because certain meeting locations are associated with certain topics and content of a meeting is less or more likely to be considered a corpus data supplement based at least in part on the location or topic. For example, if it is determined that the meeting is at building B, which is a building where engineering testing occurs, certain documents are more likely to be relevant than others, such as those documents that describe instructions for testing, building, and the like.

Meeting participant data 176 indicates the names or other identifiers of attendees at a particular meeting. In some embodiments, the meeting participant data 176 includes the relationship between attendees at a meeting. For example, the meeting participant data 176 can include a graphical view or hierarchical tree structure that indicates the most managerial position at the top or root node, with an intermediate-level manager at the branches just under the managerial position, and a senior worker at the leaf level under the intermediate-level manager. In some embodiments, the names or other identifiers of attendees at a meeting are determined automatically or in near-real-time as users speak (for example, based on voice recognition algorithms) or can be determined based on manual input of the attendees, invitees, or administrators of a meeting. In some embodiments, in response to determining the event participant data 176, the system 100 then retrieves or generates a user profile 140 for each participant of a meeting.

External data 178 corresponds to any other suitable information that can be used to determine corpus data supplements. In some embodiments, external data 178 includes any non-personalized data that can still be used to make predictions. For example, external data 178 can include learned information of human habits over several meetings even though the current participant pool for a current event is different than the participant pool that attended the historical meetings. This information can be obtained via remote sources such as blogs, social media platforms, or other data sources unrelated to a current meeting. In an illustrative example, it can be determined over time that for a particular organization or business unit, certain types of files are always produced at the last 10 minutes of a meeting. Accordingly, for the last 10 minutes of a current meeting whose particular participant pool has never met before, a candidate is more likely to be predicted as a content item to render in a meeting based on the history of the particular organization or business unit.

The corpus data supplement component 160 is generally responsible for receiving, as input, contextual data (as determined by the contextual data determiner 154) and the corpus of text received/generated by the corpus assembler 156 to derive a corpus data supplement, which is used as input (along with the corpus of text) into a language model. The corpus data supplement component 160 includes the input size constrainer 161, the corpus data supplement detector 162, and the corpus data supplement consolidator 164.

The input size constrainer 161 is generally responsible for detecting the input size constraint of a model, such as a LLM or other machine learning model. Various models are constrained on a data input size they can ingest or process due to computational expenses associated with processing those inputs. For example, a maximum input size of l4096 tokens (for davinci models) can be programmatically set. Other input sizes may not necessarily be based on token sequence length, but other data size parameters, such as bytes. Tokens are pieces of words, individual sets of letters within words, spaces between words, and/or other natural language symbols or characters (e.g., %, $, !). Before a language model processes a natural language input, the input is broken down into tokens. These tokens are not typically parsed exactly where words start or end-tokens can include trailing spaces and even sub-words. Depending on the model used, in some embodiments, models can process up to 4097 tokens shared between prompt and completion. Some models (e.g., GPT-3) takes the input (e.g., the corpus of text), converts the input into a list of tokens, processes the tokens, and converts the predicted tokens back to the words in the input. In some embodiments, the input size constrainer 161 detects an input size constraint by simply implementing a function that calls a routine that reads the input constraints.

The corpus data supplement detector 162 is generally responsible for determining which data detected by the contextual determiner 154, the user-data collection component 108, and/or within storage 125, is to be a corpus data supplement. In some embodiments, the corpus data supplement detector 162 takes as input the input size constraint detected by the input size constrainer 161, the corpus of text produced by the corpus assembler 156, and/or the contextual data determined by the contextual determiner 154 to determine what and how much data to tag or identify as the corpus data supplement.

For example, if a meeting transcript (the corpus of text) indicates a meeting of a particular business unit, the corpus data supplement detector 162 may request access, from storage 125, only those meeting profiles 170 and user profile 140 related to the particular business unit (and not request other meeting or user profiles related to other business units). In other words, for example, information about each user that is in the business unit, each email sent regarding the business unit, and the like are accessed and initially marked as a corpus data supplement candidate. Each piece of data may further be ranked or weighted based on how relevant the piece of data is for the business unit. Relevancy can be based on time (newer data is ranked higher), types of files or data used (e.g., email is used very often by the business units are ranked higher), the frequency at which data or files are exchanged (e.g., a file was sent over X threshold, indicating its importance or relevance), or the like. In some embodiments, based on the rank or weight, the corpus data supplement detector 162 can select which data is to be included as the corpus data supplement given the input constraints. For example, the corpus data supplement can first call for the input size constraint of tokens. Responsively, the corpus data supplement detector 162 can then tokenize each of the corpus data supplement candidates to generate tokens, and the responsively and progressively add each data set ranked/ weighted from highest to lowest if and until the token threshold (indicating the input size constraint) is met or exceeded, at which point the corpus data supplement detector 162 stops. In some embodiments, those candidates that fall within the threshold are selected as corpus data supplements.

The corpus data supplement consolidator 164 is generally responsible for consolidating or combining at least a portion of the corpus data supplements determined by the corpus data supplement determiner 162 and the corpus of text produced by the corpus assembler 156 and providing these data pieces as input into a model. In some embodiments, the corpus data supplement consolidator 164 does this by reformatting or appending the corpus of text itself to include the corpus data supplement(s), such as via tagging and Named Entity Recognition (NER) or other functionality within the corpus of text, as described in more detail below. Alternative or in addition to reformatting the corpus of text, the corpus data supplement consolidator 164 performs its functionality by selecting which of the corpus data supplements are to be included and passed along with the corpus of text to be used as input into a model. For example, the corpus data supplement consolidator 164 may select 3 document attachments and 2 emails (the corpus data supplements), along with the corpus of text and pass all of those data sources to a model for processing.

The model scoring component 168 is generally responsible for taking the corpus data supplement (as consolidated by the corpus data supplement consolidator 160) and the corpus of text as input and responsively generating one or more scores (e.g., a confidence answer score) or data (e.g., generative text) that are indicative of one or more predictions. For example, the one or more scores may be confidence level intervals regarding a classifier confidence level (e.g., score=0.90 (90% confident that the sentiment is positive)), a clustering score (indicating the inputs fall within a particular cluster), a regression confidence level, or relevant returned results in Question-Answer (QA) models, for example. In another example, a model may generate additional text to, for example, summarize the inputs.

In an illustrative example of a QA system, model scoring component 168 may include query processor responsible for executing a query request or question. The query processor can perform its functionality according to any suitable algorithm and based on any suitable factors. For example, in some embodiments, the document query processor uses term frequency-inverse document frequency (TF-IDF) algorithms. TF-IDF algorithms include numerical statistics that infer how important a query word or term is to a data set. "Term frequency" illustrates how frequently a term of a query occurs within a data set (for example, a digital document), which is then divided by the data set length (i.e., the total quantity of terms in the data set). "Inverse document frequency" infers how important a term is by reducing the weights of frequently used or generic terms, such as "the" and "of," which may have a high count in a data set but have little importance for relevancy of a query. Accordingly, a query may include the terms "The different models of product X." These technologies may then rank a data set the highest because it includes the words "product X" with the highest frequency compared to other data sets.

Alternatively or additionally, the model scoring component 168 uses corpus expansion (also referred to as "document expansion"). Corpus expansion is the process of finding, in a given corpus of text (and/or corpus data supplements), the complete set of entities that belong to the same semantic class of one or more seed entities (for example, terms of a query), even though those entities may not directly be located in a document. Word mismatch is a common problem in information retrieval. Most retrieval systems match documents and queries on a syntactic level (for example, TF-IDF), that is, the underlying assumption is that relevant documents contain exactly those terms that a user chooses for the query. However, a relevant document might not contain the query words as given by the user. For example, given the input query request (i.e., the "seed set") {Massachusetts, Virginia, Washington}, a set expansion method may be expected to output all other states in the United States (for example, because of historic user documents considered by the expansion method, such as past user emails), even though the other states are not directly located the document. Some embodiments alternatively or additionally locate semantically related terms to a query based on user word embedding models, such as WORD2VEC, or GloVE.

Example system 100 also includes a presentation component 120 that is generally responsible for causing presentation of content and related information to a user, such as web or app pages and their sitemap elements. In some embodiments, the presentation component 120 comprises one or more applications or services on a user device, across multiple user devices, or in the cloud. For example, in one embodiment, presentation component 120 manages the presentation of content to a user across multiple user devices associated with that user. Based on content logic, device features, associated logical hubs, inferred logical location of the user, and/or other user data, presentation component 120 may determine on which user device(s) content is presented, as well as the context of the presentation, such as how (or in what format and how much content, which can be dependent on the user device or context) it is presented and/or when it is presented. In particular, in some embodiments, presentation component 120 applies content logic to device features, associated logical hubs, inferred logical locations, or sensed user data to determine aspects of content presentation.

In some embodiments, presentation component 120 generates user interface features (or causes generation of such features) associated with pages. Such features can include user interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, a personal assistant service or application operating in conjunction with presentation component 120 determines when and how to present the content. In such embodiments, the content, including content logic, may be understood as a recommendation to the presentation component 120 (and/or personal assistant service or application) for when and how to present the notification, which may be overridden by the personal assistant app or presentation component 120.

Example system 100 also includes storage 125. Storage 125 generally stores information including data, computer instructions (for example, software program instructions, routines, or services), data structures, and/or models used in embodiments of the technologies described herein. In some embodiments, storage 125 represents any suitable data repository or device, such as a database, a data warehouse, RAM, cache, disk, RAID, and/or a storage network (e.g., Storage Area Network (SAN)). In some embodiments, storage 125 includes data records (e.g., database rows) that contain any suitable information described herein. In some embodiments, each record is called or requested and returned, over the computer network(s) 110, depending on the component needing it, as described herein.

By way of example and not limitation, data included in storage 125, may generally be referred to throughout as data. Any such data, in some embodiments, is sensed or determined from a sensor (referred to herein as sensor data), such as location information of mobile device(s), smartphone data (such as phone state, charging data, date/time, or other information derived from a smartphone), computer user-activity information (for example: app usage; online activity; searches; voice data such as automatic speech recognition; activity logs; communications data including calls, texts, instant messages, and emails; website posts; other records associated with events; or other activity related information) including computer user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor, data derived based on other data (for example, location data that can be derived from Wi-Fi, Cellular network, or IP address data), and nearly any other source of data that may be sensed or determined as described herein.

Figure 2:
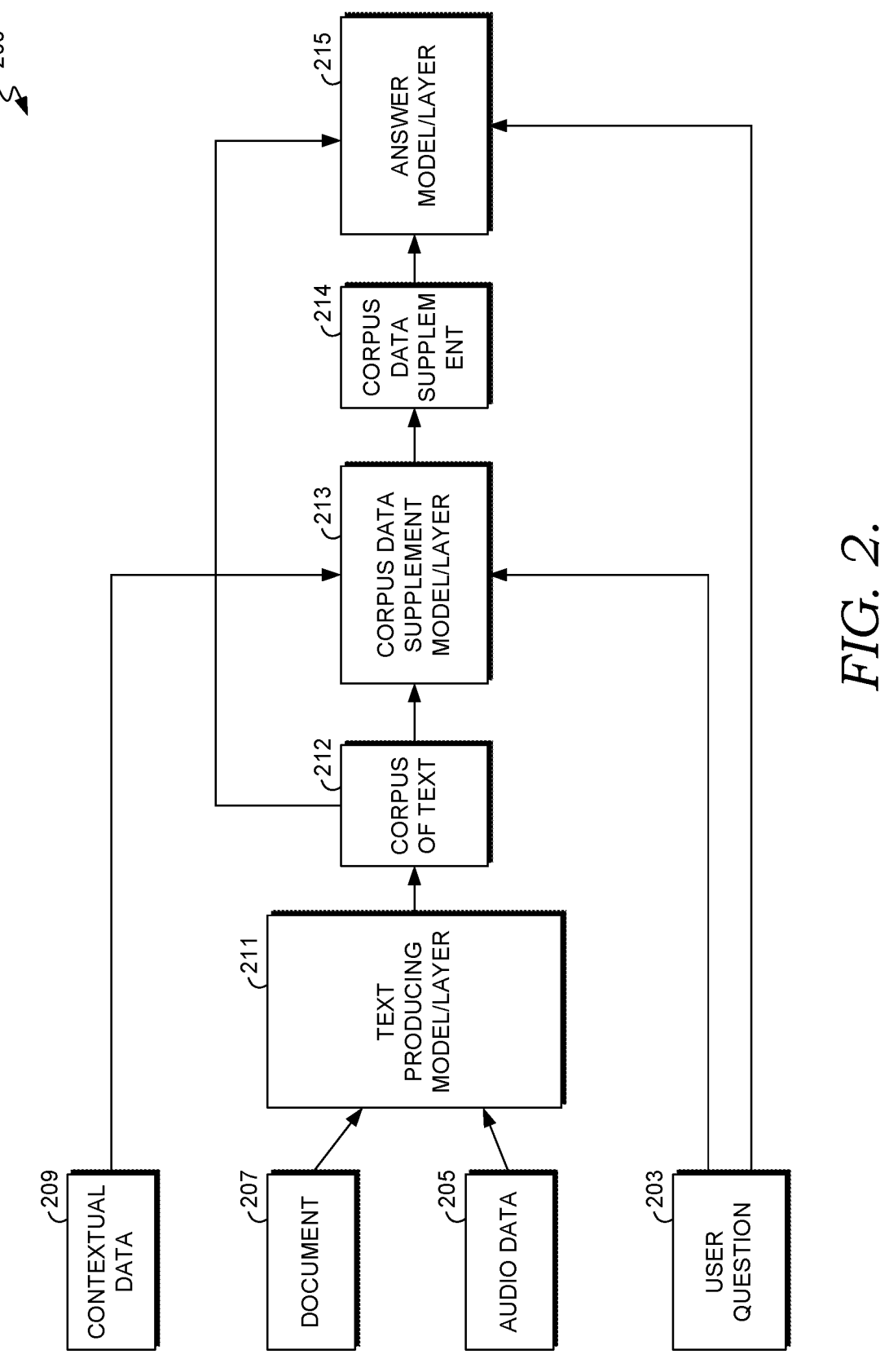
FIG. 2 is a schematic diagram illustrating different models or layers, each of their inputs, and each of their outputs, according to some embodiments.

FIG. 2 is a schematic diagram illustrating different models or layers, each of their inputs, and each of their outputs, according to some embodiments. At a first time, the text producing model/layer 211 receives a document 207 and/or the audio data 205. In some embodiments, the document 207 is a raw document or data object, such as an image of a tangible paper or particular file with a particular extension (for example, PNG, JPEG, GIFF). In some embodiments, the document is any suitable data object, such as a web page (such as a chat page), an app activity, or the like. The audio data 205 may be any data that represents sound, where the sound waves from one or more audio signals have been encoded into other forms, such as digital sound or audio. The resulting form can be recorded via any suitable extensions, such as WAV, Audio Interchange File Format (AIFF), MP3, and the like. The audio data may include natural language utterances, as described herein.

At a second time subsequent to the first time, the text producing model/layer 211 converts or encodes the document 207 into a machine-readable document and/or converts or encodes the audio data into the corpus of text 212. In some embodiments, the functionality of the text producing model/layer 211 represents or includes the functionality as described with respect to the corpus assembler 156 of FIG. 1. For example, in some embodiments, the text producing model/layer 211 performs OCR on the document 207 (an image) in order to produce a machine-readable document. Alternatively or additionally, the text producing model/layer 211 performs speech-to-text functionality to convert the audio data 305 into a transcription document and performs NLP, as described with respect to the corpus assembler 156.

At a third time, subsequent to the second time, the corpus data supplement model/layer 313 receives, as input: the corpus of text 212 produced by the text producing model/ layer 211 (for example, a speech-to-text document), contextual data 209 (e.g., as determined by the contextual data determiner 154), and/or user question 203 (e.g., a query) in order to determine what corpus data supplements to include as input into the answer model/layer 215. In some embodiments, the corpus data supplement model/layer 213 is included in the corpus data supplement component 160 of FIG. 1. In some embodiments, the corpus data supplement model/layer 213 determines which of the contextual data 209 to select as a corpus data based on an intent of the user question 203. An "intent" as described herein refers to a NLP process that classifies or otherwise predicts that a particular natural language sequence or utterance (e.g., a question in a query) as belonging to a specific semantic meaning. For example, a first intent of a natural language utterance may be to derive a due date for a project "Red Sea," as opposed to an intent regarding a dew point of a body of water of Red Sea. In some embodiments, those intents are weighted higher for corpus data supplements based on what is found within the contextual data 209. Some embodiments use one or more natural language models to determine intent, such as intent recognition models, BERT, WORD2VEC, and/or the like. Such models may not only be pre-trained to understand basic human language, such as via Masked Language Modeling (MLM) and Next Sentence Prediction (NSP), but can be fine-tuned to understand natural language via the contextual data 209.

In some embodiments, the contextual data 209 refers to any data described with respect to the meeting profile 170, the user profile 140, the user-data collection component 108 and/or the contextual determiner 154. For example, contextual data can be information about a meeting transcript, which can be used to enrich the transcript as a corpus data supplement to be provided as input into an LLM. For example, the contextual data may comprise contextual data about the meeting (e.g., date, time attendees, agenda, attachments), an organization chart or information about which teams/business units the people attending the meeting are on (or the people mentioned in the transcript). In some embodiments, a portion or summary of this contextual data is appended to the transcript and provided with the transcript as input in to the LLM.

In some embodiments, an intent is explicit. For instance, a user may directly request or ask for a file in the user question 203. However, in alternative embodiments, the intent is implicit. For instance, the user may not directly request or ask for a file, but the contextual data 209 indicates or suggests that a document would be useful to surface for a user. For example, an attendee might say, "the last email I sent you describes examples of the problem I'm talking about . . . ." The attendee may not explicitly tell other attendees to open the email. However, the intent may still be to surface the email, as it might be useful. In some embodiments, the user question 203 need not be an explicit question, but some other prompt or query, such as "draft a letter to my colleague" or "make a slide show presentation with photographs."

At a fourth time subsequent to the third time, the answer model/layer 215 takes, as input, the corpus of text 212, the corpus data supplement 214, and/or the user question 203 in order to generate, at the final output, a score indicative of a predicted answer to the user question 203. In some embodiments, the answer model/layer 215 represents or includes the functionality as described with respect to the model scoring component 168 of FIG. 1. In some embodiments, the model scoring component 168 also formulates its answer based on the intent (whether explicit or implicit) indicated in the user question 203, as described above with respect to the corpus data supplement model/layer 213. In an illustrative example, in response to receiving the user question 203— e.g., "When is Red Sea due?" the answer model/layer 215 may generate a natural language sequence answer "Red Sea is due on Mar. 2, 2023" based on performing NLP on the corpus of text 212, the corpus data supplement 214, and the user question 203. In some embodiments, the answer model/ layer 215 need not be a QA model (and there may be no user question 203), as illustrated in FIG. 2. Rather, in some embodiments, component 215 represents other model types, such as a classifier, a clustering algorithm, a text generator, or the like.

In some embodiments, the answer model/layer 215 includes data other than text, such as photographs and the like. In these embodiments, a process may perform object detection or other image processing functionality to classify or otherwise identify objects in an image. Responsive to a query, for example, particular embodiments then responsively search for images relevant to a query. For instance, for queries that say, "put images of Jerry in the presentation," particular embodiments to a computer search for images where "Jerry" is the label (based on object detection or other image processing).

Figure 3:
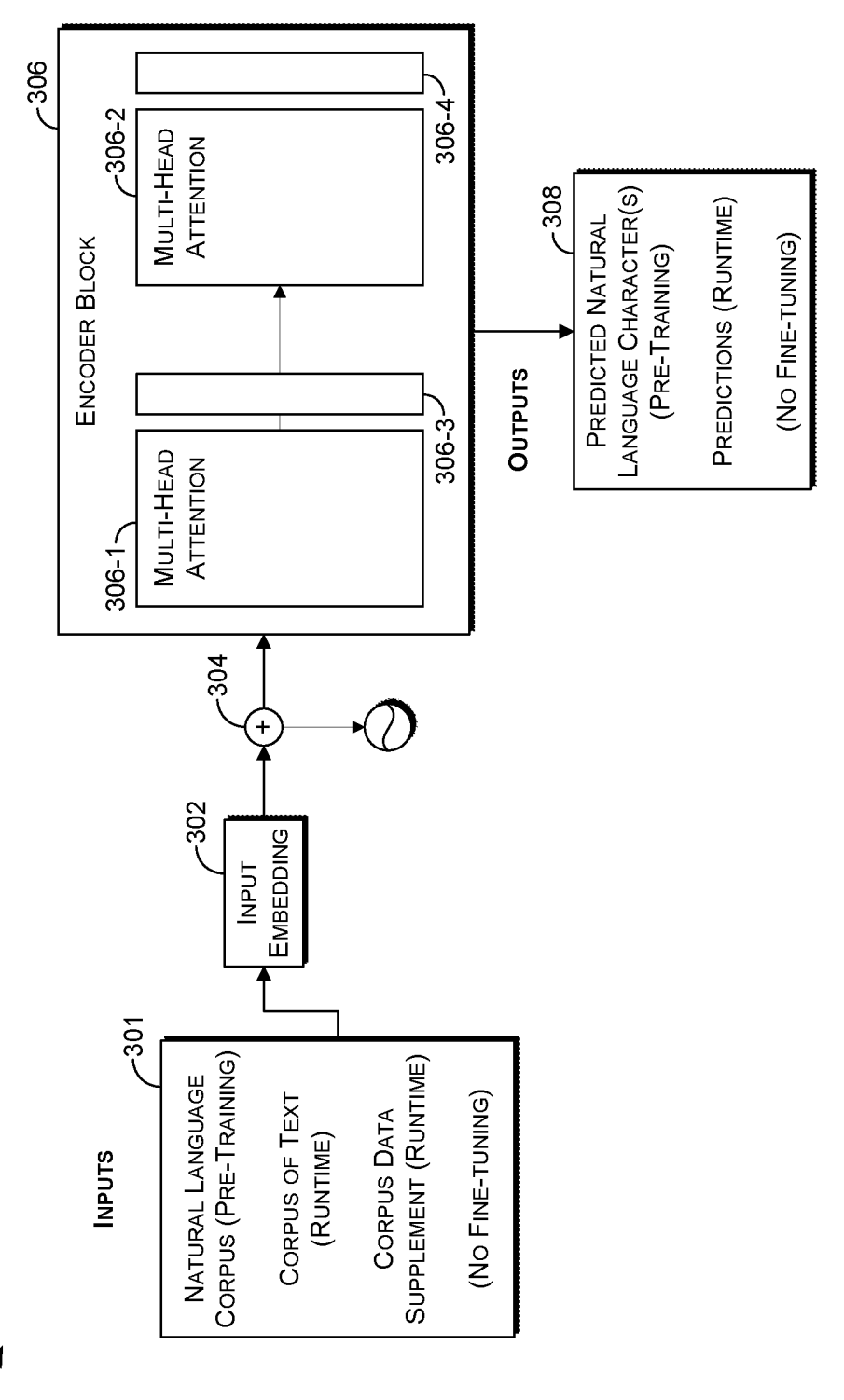
FIG. 3 is a block diagram of a modified BERT model or encoder that uses particular inputs to make particular predictions, according to some embodiments.

FIG. 3 is a block diagram of a modified BERT model or encoder that uses particular inputs to make particular predictions (e.g., answers to questions), according to some embodiments. In some embodiments, this model represents or includes the functionality as described with respect to the model scoring component 168 of FIG. 1 and/or the answer model/layer 215 of FIG. 2.

First, a natural language corpus (e.g., various WIKIPEDIA English words or BooksCorpus) of the inputs 301 are converted into tokens and then feature vectors and embedded into an input embedding 402 (FIG. 4) to derive meaning of individual natural language words (for example, English semantics) during pre-training. In some embodiments, to understand English language, corpus documents, such as text books, periodicals, blogs, social media feeds, and the like are ingested by the model.

In some embodiments, each word or character in the input(s) 301 is mapped into the input embedding 302 in parallel or at the same time, unlike existing long short-term memory (LSTM) models, for example. The input embedding 302 maps a word to a feature vector representing the word. But the same word (for example, "apple") in different sentences may have different meanings (for example, phone v. fruit). This is why a positional encoder 304 can be implemented. A positional encoder 304 is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$PE_{(pos,2i)} = \sin\left(pos/10000^{2i/d_{model}}\right)$$

$$PE_{(pos,2i+1)} = \cos\left(pos/10000^{2i/d_{model}}\right)$$

After passing the input(s) 301 through the input embedding 502 and applying the positional encoder 304, the output is a word embedding feature vector, which encodes positional information or context based on the positional encoder 304. These word embedding feature vectors are then passed to the encoder block 306, where it goes through a multi-head attention layer 306-1 and a feedforward layer 306-2. The multi-head attention layer 306-1 is generally responsible for focusing or processing certain parts of the feature vectors representing specific portions of the input(s) 301 by generating attention vectors. For example, in Question Answering systems, the multi-head attention layer 506-1 determines how relevant the ith word (or particular word in a block) is for answering the question or relevant to other words in the same or other blocks, the output of which is an attention vector. For every word, some embodiments generate an attention vector, which captures contextual relationships between other words in the same sentence or other sequence of characters. For a given word, some embodiments compute a weighted average or otherwise aggregate attention vectors of other words that contain the given word (for example, other words in the same line or block) to compute a final attention vector.

In some embodiments, a single headed attention has abstract vectors Q, K, and V that extract different components of a particular word. These are used to compute the attention vectors for every word, using the following formula:

$$Z = \text{softmax}\left(\frac{Q \cdot K^T}{\sqrt{\text{Dimension of vector } Q, K \text{ or } V}}\right) \cdot V$$

For multi-headed attention, there a multiple weight matrices $W^q$, $W^k$ and $W^v$. so there are multiple attention vectors Z for every word. However, a neural network may only expect one attention vector per word. Accordingly, another weighted matrix, $W^z$, is used to make sure the output is still an attention vector per word. In some embodiments, after the layers 306-1 and 306-2, there is some form of normalization (for example, batch normalization and/or layer normalization) performed to smoothen out the loss surface making it easier to optimize while using larger learning rates.

Layers 306-3 and 306-4 represent residual connection and/or normalization layers where normalization re-centers and re-scales or normalizes the data across the feature dimensions. The feedforward layer 306-2 is a feed forward neural network that is applied to every one of the attention vectors outputted by the multi-head attention layer 306-1. The feedforward layer 306-2 transforms the attention vectors into a form that can be processed by the next encoder block or making a prediction at 308. For example, given that a historical document includes first natural language sequence "the due date is . . . " the encoder block 306 predicts that the next natural language sequence (or field type) will be a specific date or particular words based on past documents that include language identical or similar to the first natural language sequence.

In some embodiments, the encoder block 306 includes pre-training to learn language (pre-training) and make corresponding predictions. In some embodiments, as illustrated in FIG. 3, there is no fine-tuning because of the determined corpus data supplements, which is different than typical BERT models. Pre-training is performed to understand language and fine-tuning is performed to learn a specific task, such as learning an answer to a set of questions (in Question Answering systems).

In some embodiments, the encoder block 306 learns what language and context for a word is in pre-training by training on two unsupervised tasks (MLM and NSP) simultaneously or at the same time. In terms of the inputs and outputs, at pre-training, the natural language corpus of the inputs 301 may be various historical documents, such as text books, journals, periodicals in order to output the predicted natural language characters in 308 (not make the predictions at runtime at this point). The encoder block 306 takes in a sentence, paragraph, or sequence (for example, included in the input(s) 301), with random words being replaced with masks. The goal is to output the value or meaning of the masked tokens. For example, if a line reads, "please [MASK] this document promptly," the prediction for the "mask" value is "send." This helps the encoder block 306 understand the bidirectional context in a sentence, paragraph, or line at a document. In the case of NSP, the encoder 306 takes, as input, two or more elements, such as sentences, lines, or paragraphs and determines, for example, if a second line in a document actually follows (for example, is directly below) a first line in the document. This helps the encoder block 306 understand the context across all the elements of a document, not just within a single element. Using both of these together, the encoder block 306 derives a good understanding of natural language.

In some embodiments, during pre-training, the input to the encoder block 306 is a set (for example, 2) of masked sentences (sentences for which there are one or more masks), which could alternatively be partial strings or paragraphs. In some embodiments, each word is represented as a token, and some of the tokens, are masked. Each token is then converted into a word embedding (for example, 302). At the output side is the binary output for the next sentence prediction. For example, this component may output 1, for example, if masked sentence 2 followed (for example, was directly beneath) masked sentence 1. The output is word feature vectors that correspond to the outputs for the machine learning model functionality. Thus, the number of word feature vectors that are input is the same number of word feature vectors that are output.

In some embodiments, the initial embedding (for example, the input embedding 302) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence number (that includes the input(s) 301) that is encoded into a vector (for example, first sentence, second sentence, etc. assuming a top-down and right-to-left approach). The position embeddings are vectors that represent the position of a particular word in such sentence that can be produced by positional encoder 504. When these three embeddings are added or concatenated together, an embedding vector is generated that is used as input into the encoder block 306. The segment and position embeddings are used for temporal ordering since all of the vectors are fed into the encoder block 306 simultaneously and language models need some sort of order preserved.

In pre-training, the output is typically a binary value C (for NSP) and various word vectors (for MLM). With training, a loss (for example, cross entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, once pre-training is performed, the encoder block 506 is tested on very specific tasks, such as Question Answering, modified NSP or MLM, and then deployed in preparation to analyze the corpus of text and the corpus data supplement (in the inputs 301) at runtime. Accordingly certain embodiments do not have to change the model for fine-tuning by changing the input layer and the output layer or otherwise adjusting the weights of the neural network node connections, as would otherwise be required by fine-tuning.

In an illustrative example of predictions or making inferences in the output 308 with the encoder block 306, some embodiments learn that given its understanding of human natural language (via pre-training), the corpus data supplement, and the corpus of text, a particular set of words (e.g., "Red Sea") has a particular meaning (e.g., "a work project") and that the intent is to derive a due date. Accordingly, the predictions at 308 may be generative text that is an answer to a question. It is understood that a different model/training process is alternatively or additionally used compared to Question Anwering systems or the model in FIG. 3. For example, in some embodiments, an annotator (either programmatic or human) is used to label different fields within a fine-tuning dataset of pages and the predictions 308 are based on learning weights associated with different features of the labeled fields. For example, annotators label each word or sequence (e.g., labeling the sequence XJ5 as a work project). In this way, the model learns weights or features that are indicative of the particular annotated field. For example, for multiple pages with multiple annotated phone number fields, the model learns that these phone number fields always contain 3 numbers, followed by a dash, followed by 4 additional numbers.

Figure 4:
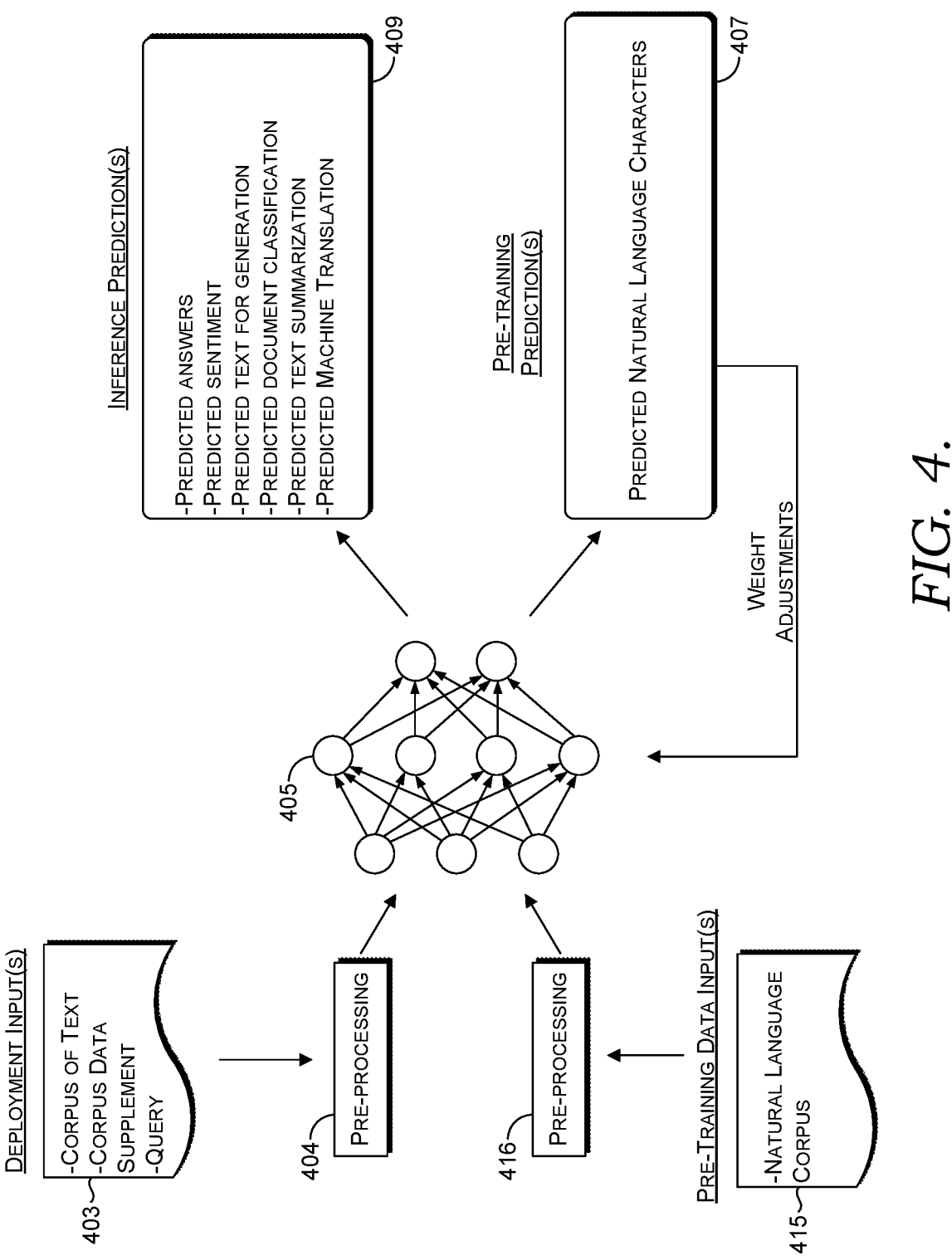
FIG. 4 is a schematic diagram illustrating how a neural network makes particular training and deployment predictions given specific inputs, according to some embodiments.

FIG. 4 is a schematic diagram illustrating how a neural network 405 makes particular training and deployment predictions given specific inputs, according to some embodiments. In one or more embodiments, the neural network 405 represents or includes at least some of the functionality as described with respect to the modified BERT model 300 of FIG. 3. In some embodiments, the neural network 405 represents or includes alternative or additional model functionality, such as supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

In some embodiments, the neural network 405, as illustrated in FIG. 4, has multiple input nodes (input layer), hidden nodes, and multiple output nodes (an output layer), where each node represents an input variable or feature (e.g., meeting name, user device ID, attendees of a meeting, date of meeting, and meeting agenda) and where each node comprises a linear/non-linear function and an activation function. Every node in one layer is connected to every other node in the next layer. A given node typically takes the weighted sum of its inputs, and passes it through an activation function (e.g., a dot product vector). This is the output of the node, which then becomes the input of another node in the next layer. The signal flows from left to right, and the final output is calculated by performing this procedure for all the nodes. Training a neural network typically means learning the weights associated with all the edges (the lines connecting the nodes). The input features (x) are typically fed into the linear/non-linear function of each node, resulting in a value, z. Then, the value z is fed into the activation function, which determines if a node is activated or inhibited (e.g., between 0 and 1). Thus, each node ultimately determines which nodes in the following layer get activated, until it reaches an output.

In some embodiments, before the training data input(s) 415 (or the deployment input(s) 404) are provided as input into the neural network 405, the inputs are preprocessed at 416 (or 404). In some embodiments, such pre-processing includes data wrangling, data munging, scaling, and the like. Data wrangling and data munging refers to the process of transforming and mapping data from one form (e.g., "raw") into another format with to make it more appropriate and useable for downstream processes (e.g., predictions 407). Scaling (or "feature scaling") is the process of changing number values (e.g., via normalization or standardization) so that a model can better process information. For example, some embodiments can bind number values between 0 and 1 via normalization. Other examples of preprocessing includes feature extraction, handling missing data, feature scaling, and feature selection.

Feature extraction involves computing a reduced set of values from a high-dimensional signal capable of summarizing most of the information contained in the signal. Feature extraction techniques develop a transformation of the input space onto the low-dimensional subspace that attempts to preserve the most relevant information. In feature selection, input dimensions that contain the most relevant information for solving a particular problem are selected. These methods aim to improve performance, such as estimated accuracy, visualization, and comprehensibility. An advantage of feature selection is that important information related to a single feature is not lost, but if a small set of features is required and original features are very diverse, there is chance of information being lost as some of the features must be omitted. On the other hand, with dimensionality reduction, also known as feature extraction, the size of the feature space can often be decreased without losing information about the original feature space.

In some embodiments, these feature extraction techniques include, but are not limited to Minimum Redundancy Maximum Relevance ("mRmR"), Relief, Conditional Mutual Information Maximization ("CMIM"), Correlation Coefficient, Between-Within Ratio ("BW-ratio"), Interact, Genetic Algorithms ("GA"), Support Vector Machine-Recursive Feature Elimination ("SVM-REF"), Principal Component Analysis ("PCA"), Non-Linear Principal Component Analysis, Independent Component Analysis, and Correlation based feature selection. These feature extraction techniques are useful for machine learning because they can reduce the complexity of input data and give a simple representation of data representing each variable in feature space as a linear combination of the original input variable.

In some embodiments, the pre-processing of the data at 416 and/or 404 includes missing data techniques. In some embodiments, these missing data techniques include complete case analysis, single imputation, log-linear models and estimation using the EM algorithm, propensity score matching, and multiple imputations. The technique confines attention to cases for which all variables are observed in a complete case analysis. In a single implicit imputation method, missing values are replaced by values from similar responding units in the sample. The similarity is determined by looking at variables observed for both respondent and non-respondent data. Multiple imputations replace each missing value with a vector of at least two imputed values from at least two draws. These draws typically come from stochastic imputation procedures. In the log linear model, cell counts of a contingency table are modeled directly. An assumption can be that, given expected values for each cell, the cell counts follow independent multivariate Poisson distributions. These are conditional on the total sample size, with the counts following a multinomial distribution.

In some embodiments, the preprocessing at 416 and/or 404 includes outlier detection and correction techniques for handling outlier data within the input data 415/403. Outliers, by virtue of being different from other cases, usually exert a disproportionate influence on substantive conclusions regarding relationships among variables. An outlier can be defined as a data point that deviates markedly from other data points.

For example, error outliers are data points that lie at a distance from other data points because they result from inaccuracies. More specifically, error outliers include outlying observations that are caused by not being part of the targeted population of data, lying outside the possible range of values, errors in observation, errors in recording, errors in preparing data, errors in computation, errors in coding, or errors in data manipulation. These error outliers canbe handled by adjusting the data points to correct their values or more such data points from the data set. In some implementations, particular embodiments define values more than three scaled median absolute deviations ("MAD") away from the median as outliers. Once defined as an outlier, some embodiments replace the values with threshold values used in outlier detection.

In some embodiments, the preprocessing at 416 and/or 404 includes feature scaling on the input(s) 416 and/or 404 as part of the data preprocessing process. Feature scaling is a method to unify self-variables or feature ranges in data. In some embodiments, feature scaling is a necessary step in the calculation of stochastic gradient descent. Particular embodiments can perform various feature scaling techniques. In some embodiments, these feature scaling techniques include, but are not limited to, data normalization methods and interval scaling.

In some embodiments, preprocessing at 416 and/or 404 includes data normalization. Data normalization is a basic work of data mining. Different evaluation indicators often have different dimensions, and the difference in numerical values may be very large. Without processing, the results of data analysis may be affected. Standardized processing is needed in order to eliminate the influence of dimension and range differences between indicators. The data is scaled to a specific area to facilitate comprehensive analysis. The premise of the normalization method is that the eigenvalues obey the normal distribution, and each genus is transformed into a standard positive distribution with a mean of 0 and a variance of 1 by translation and scaling data transformation. The interval method utilizes the boundary information to scale the range of features to a range of features. For example, the commonly used interval scaling methods such as [0, 1] use two extreme values (maximum and minimum values) for scaling.

In some embodiments, the preprocessing at 416 and/or 404 includes feature selection at the input data 415 and/or 403. Feature selection techniques can be performed for dimensionality reduction from the extracted features. The feature selection techniques can be used to reduce the computational cost of modeling, to achieve a better generalized, high-performance model that is simple and easy to understand. Feature extraction techniques can be performed to reduce the input data's dimensionality. However, in some implementations, the resulting number of features may still be higher than the number of training data 415. Therefore, further reduction in the dimensionality of the data can be performed using feature selection techniques to identify relevant features for classification and regression. Feature selection techniques can reduce the computational cost of modeling, prevent the generation of a complex and over-fitted model with high generalization error, and generate a high-performance model that is simple and easy to understand. Some embodiments use the mRmR sequential feature selection algorithm to perform feature selection 116. The mRmR method is designed to drop redundant features, which can design a compact and efficient machine learning-based model.

After preprocessing at 416, in various embodiments, the neural network 405 is trained using one or more data sets of the preprocessed training data input(s) 415 in order to make acceptable loss training prediction(s) 407 at the appropriate weights, which will help later at deployment time to make correct inference prediction(s) 409. In one or more embodiments, learning or training includes minimizing a loss function between the target variable (for example, an incorrect prediction that a phrase has semantic meaning X) and the actual predicted variable (for example, a correct prediction that the phrase has semantic meaning Y). Based on the loss determined by a loss function (for example, Mean Squared Error Loss (MSEL), cross-entropy loss, etc.), the loss function learns to reduce the error in prediction over multiple epochs or training sessions so that the neural network 405 learns which features and weights are indicative of the correct inferences, given the inputs. Accordingly, it is desirable to arrive as close to 100% confidence in a particular classification or inference as close as possible so as to reduce the prediction error. In an illustrative example, the neural network 405 learns over several epochs that for a given set of character sequences, the correct meaning or the text to be generated next is Y.

Subsequent to a first round/epoch of training, the neural network 405 makes predictions with a particular weight value, which may or may not be at acceptable loss function levels. For example, the neural network 405 may process the pre-processed training data input(s) 415 a second time to make another pass of prediction(s) 407. This process may then be repeated over multiple iterations or epochs until the weight values are set for optimal or correct predicted value(s) is learned (for example, by maximizing rewards and minimizing losses) and/or the loss function reduces the error in prediction to acceptable levels of confidence.

In one or more embodiments, the neural network 405 converts or encodes the runtime deployment input(s) 403 and training data input(s) 415 into corresponding feature vectors in feature space (for example, via a convolutional layer(s)). A "feature vector" (also referred to as a "vector") as described herein may include one or more real numbers, such as a series of floating values or integers (for example, [0, 1, 0, 0]) that represent one or more other real numbers, a natural language (for example, English) word and/or other character sequence (for example, a symbol (for example, @, !, #), a phrase, and/or sentence, etc.). Such natural language words and/or character sequences correspond to the set of features and are encoded or converted into corresponding feature vectors so that computers can process the corresponding extracted features. For example, embodiments can parse, tokenize, and encode each value or other content in pages into one or more feature vectors.

In some embodiments, such as in clustering techniques, the neural network 405 learns, via training, parameters, or weights so that similar features are closer (for example, via Euclidian or cosine distance) to eachother in feature space by minimizing a loss via a loss function (for example, Triplet loss or GE2E loss). Such training occurs based on one or more of the preprocessed training data input(s) 415, which are fed to the neural network 405.

One or more embodiments determine one or more feature vectors representing the input(s) 415 in vector space by aggregating (for example, mean/median or dot product) the feature vector values to arrive at a particular point in feature space. For example, certain embodiments formulate a dot product of all contextual information, such as name of meeting, user device ID, attendees of a meeting, meeting agenda, name or type of an associated file, and then aggregates or concatenates these values into a single feature vector.

In one or more embodiments, the neural network 405 learns features from the training data input(s) 415 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (a hidden or output layer). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores.

In another illustrative example of training, one or more embodiments learn an embedding of feature vectors based on learning (for example, deep learning) to detect similar features between training data input(s) 415 in feature space using distance measures, such as cosine (or Euclidian) distance. For example, the training data input 415 is converted from string or other form into a vector (for example, a set of real numbers) where each value or set of values represents the individual features (for example, meeting name, meeting agenda, or other contextual data) in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, the neural network 405 can learn that the semantic meaning of "Apple" when next to certain other words refers to a company, as opposed to a fruit. Consequently, this pattern can be weighted (for example, a node connection is strengthened to a value close to 1), whereas other node connections (for example, fruit) are inhibited. In this way, embodiments learn weights corresponding to different features such that similar features found in inputs contribute positively for predictions.

In some embodiments, such training is supervised using annotations or labels. Alternatively or additionally, in some embodiments, such training is not-supervised using annotations or labels but can, for example, include clustering different unknown clusters of data points together. For example, in some embodiments, training includes (or is preceded by) annotating/labeling training data 415 so that the neural network 405 learns the features (e.g., the semantic meaning of words), which is used to change the weights/neural node connections for future predictions. As such, the neural network 405 accordingly adjusts the weights or deactivates nodes such that sorting facility B, for example, is not as strong of a signal to use for re-routing the assets that have particular common attributes given the historical data.

In one or more embodiments, subsequent to the neural network 405 training, the neural network 405 (for example, in a deployed state) receives one or more of the pre-processed deployment input(s) 403. When a machine learning model is deployed, it has typically been trained, tested, and packaged so that it can process data it has never processed. Responsively, in one or more embodiments, the deployment input(s) 403 are automatically converted to one or more feature vectors and mapped in the same feature space as vector(s) representing the training data input(s) 415 and/or training predictions(s) 407. Responsively, one or more embodiments determine a distance (for example, a Euclidian distance) between the one or more feature vectors and other vectors representing the training data input(s) 415 or predictions, which is used to generate one or more of the inference prediction(s) 409. In some embodiments, the pre-processed deployment input(s) 403 are fed to the layers of neurons of the neural network 405, where the weights dictate the output.

In an illustrative example, the neural network 405 receives a corpus of text, a corpus data supplement, and/or a user query (the deployment inputs 403). The neural network 405 then determines a distance (for example, a Euclidian distance) between the vector representing the runtime deployment input(s) 403 and the training data input(s) 415, where the input(s) 403 are passed through the same activated/deactivated nodes. Based on the distance being within a threshold distance, particular embodiments generate a score at inference prediction(s) 409, such as a predicted answer to the query, predicted sentiment, predicted text for text generation, predicted document classification, or predicted text generation. In another example, the prepro-cessed deployment input(s) 403 are run through the neural network 405, where the weights have been learned such that the input(s) 403 are mapped, for example, via a classifier or regression component, to the correct class or prediction.

In certain embodiments, the inference prediction(s) 409 (e.g., as produced by the model scoring component 168) may either be hard (for example, membership of a class is a binary "yes" or "no") or soft (for example, there is a probability or likelihood attached to the labels). Alterna-tively or additionally, transfer learning may occur. Transfer learning is the concept of re-utilizing a pre-trained model for a new related problem (for example, a new video encoder, new feedback, etc.).

FIG. 5 is a screenshot 500 of an example user interface for returning search results of a query based on reading a meeting transcript 502 that includes various corpus data supplements, according to some embodiments. The screen-shot 500 (or web/app page) includes a corpus of text, which is a meeting transcript 502. The screenshot 500 further includes a window pane 516, which includes a search field 518 configured to receive a user query, as well as search results 520.

At a first time, the search field 518 receives a user query, which is natural language input that is in the form of a question-"When does Orion close?" Existing models would interpret Orion as a constellation and therefore produce inaccurate or incorrect results. However, as described herein, various embodiments annotate a corpus of text with corpus data supplements, which offer semantic clues to models as to the meaning and context of certain terms. For example, in the meeting transcript 502, next to the word "closing" there is a tag 506 ("[date: Apr. 1, 2023; deal: Orion]"), which is a corpus data supplement and indicates that this "closing" word is referring to a "date" entity, the actual date "Apr. 1, 2023" and that the date is referring to the date the Orion deal is closing. Responsively, the model uses its QA functionality to produce the search result 520—"The Orion deal closes on Apr. 1, 2023," which is an answer to the query.

The meeting transcript 502 includes various other corpus data supplement tags 504, 506, 508, 510, 512, and 514. Each of these tags are introduced first by an entity (e.g., via Named Entity Recognition (NER)), and values associated with those entities. For example, regarding the tag 504, the word "it" refers to a "document" entity, which refers to sales report document saved as "Sales_Report_3.31.2023. NER is described in more detail below.

In this context of the present disclosure, for example, these tags or labels can indicate whether certain extracted attributes correspond to a project name, a meeting name, a meeting participant, a particular document or file, a role of a person, and the like. Such entities can be determined based on scanning contextual data from external sources, such as emails, chats, SMS texts, files, documents, attachments to emails, and the like. For example, some embodiments first perform TF-IDF to match certain words in the meeting transcript 502 to find corresponding words in the contextual data. Then particular embodiments perform NLP on the words in the contextual data to detect contextual words (e.g., words within a certain token distance) around the terms, which offers semantic cues on the meeting of such words. In some embodiments, the text within the tags are generated based on text generation techniques (e.g., via pre-training a model on NSP and/or MLM, as described herein) so that the text corresponds to a free-forming sentence or phrase, which helps a model give a search result that makes more sense to the end user.

Figure 6:
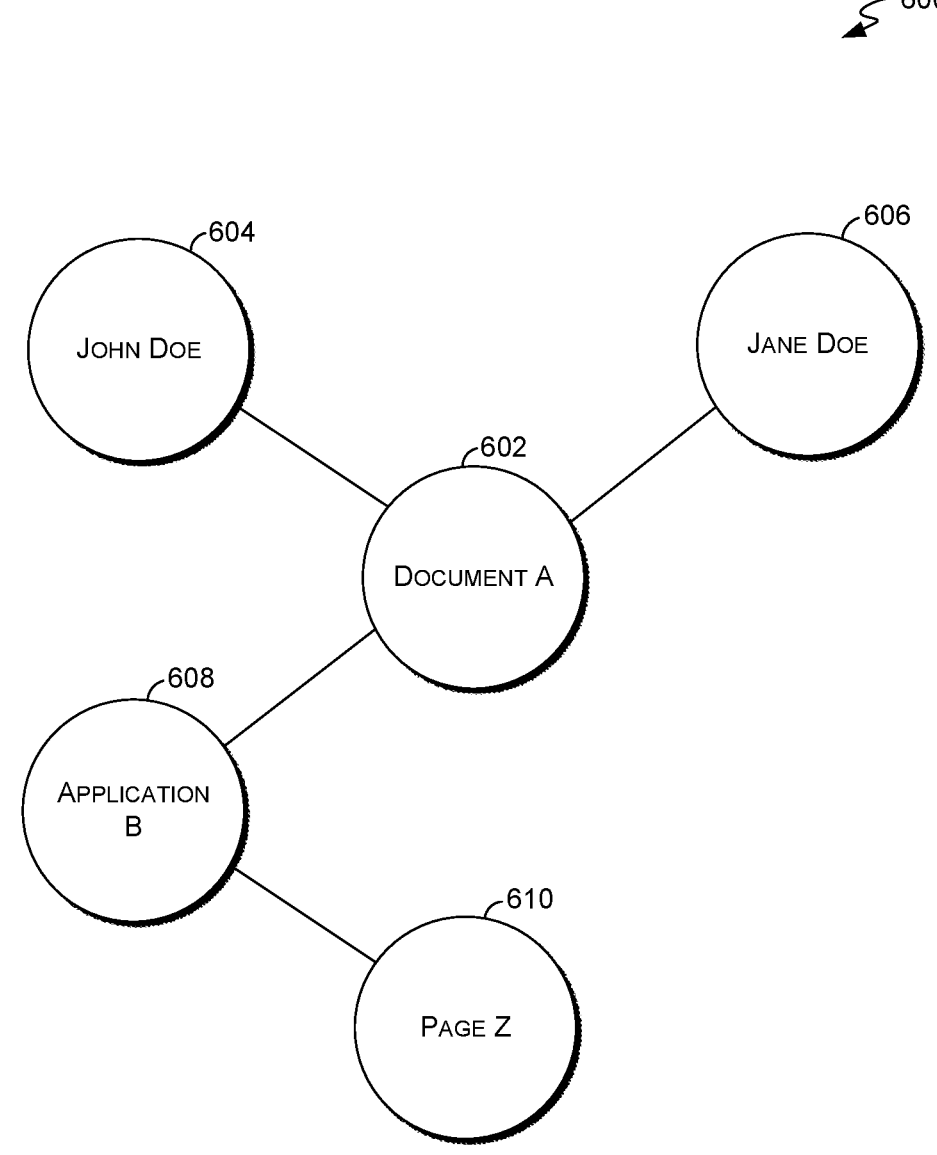
FIG. 6 is a schematic diagram of an example network graph, according to some embodiments.

FIG. 6 is a schematic diagram of an example network graph 600, according to some embodiments. In some embodiments, the network graph 600 is a structure used by the contextual data determiner 154 (and/or the corpus data supplement detector 162) to derive contextual data relevant to a particular corpus of text. A network graph is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, the network graph 600 (an undirected graph) includes the nodes or vertices of: 602 (representing docu-ment A), 604 (representing John Doe), 606 (representing Jane Doe), 608 (representing application B), and node 610 (representing page Z of application B).

The network graph 600 specifically shows the relation-ships between document A (the corpus of text), and various users (John Doe and Jane Doe) that have accessed or created the document A, as well as an application (application A, e.g., OUTLOOK), where document A was attached. In this way, for example, the contextual data determiner 154 (and/or the corpus data supplement detector 162) "walks" the network graph 600 to detect all users and applications that have interacted with or used the given corpus of text-document A. For example, the network graph 600 may indicate that John Doe created document A and that Jane Doe accessed document A 3 times (e.g., based on the thickness or quantity of edges between nodes 602 and 606), and that document A was provided as an attachment when sending an email on Application B. Responsively, for example, particular embodiments then responsively access the email and copy all of the natural language text, which may offer more clues as to the semantic meaning of a term, which may then be used as a corpus data supplement. Likewise, some embodiments responsively look-up or read user accounts or other data, such as messages or emails, of John Doe or Jane Doe because of their strong connection to document A.

It is understood that the node 602 need not represent document A, but can represent any other suitable corpus of text, such as a meeting transcript, a chat message, or the like. For example, where node 602 represents a meeting tran-script, the nodes 604 and 606 may represents people who attended, were invited, or who spoke at a corresponding meeting and those people may have other nodes attached to their corresponding nodes, such as emails or chats they sent before the meeting, documents they've interacted with before the meeting, and the like, some or all of which may be read and be used as contextual data.

Figure 7:
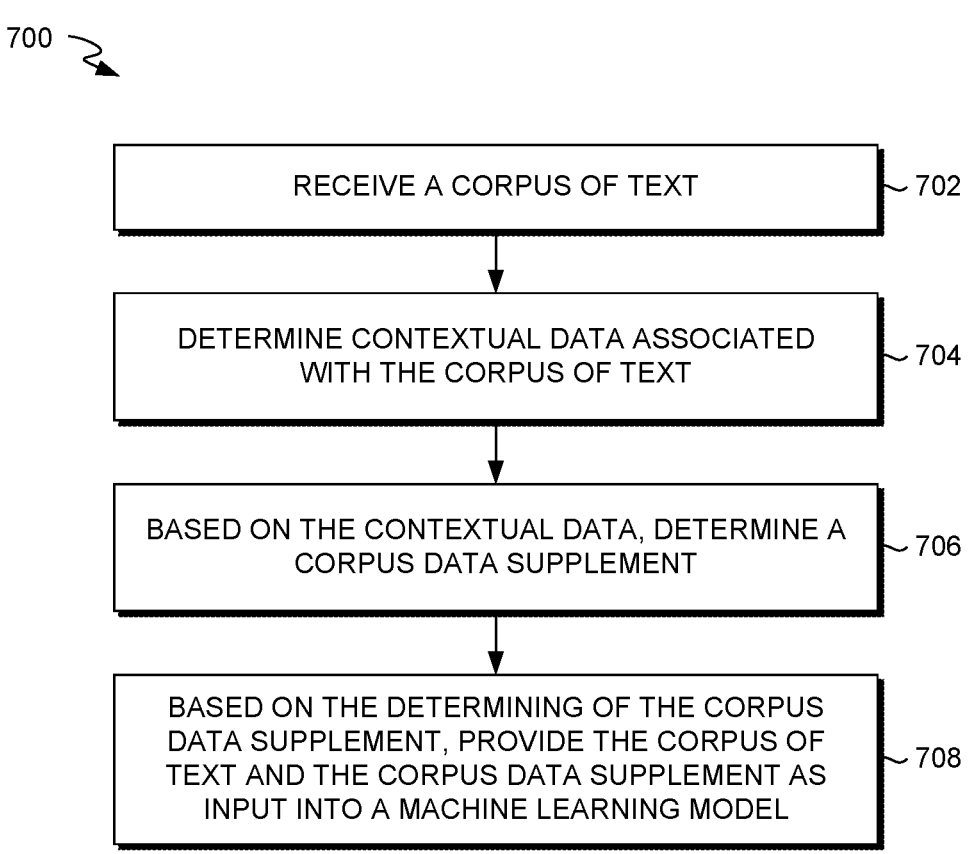
FIG. 7 is a flow diagram of an example process for determining and using a corpus data supplement as input into a machine learning model, according to some embodiments.

FIG. 7 is a flow diagram of an example process 700 for determining and using a corpus data supplement as input into a machine learning model, according to some embodiments. The process 700 (and/or any of the functionality described herein) may be performed by processing logic that comprises hardware (for example, circuitry, dedicated logic, programmable logic, microcode, and the like), software (for example, instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (for example, as described with respect to FIGS. 1-6). The computer-implemented method, the system (that includes at least one computing device having at least one processor and at least one computer readable storage medium), and/or the computer readable medium as described herein may perform or be caused to perform the process 800 or any other functionality described herein.

Per block 702, some embodiments receive a corpus of text. A "corpus of text" as described herein refers to any medium (e.g., a file, a chat thread, a document, a web or app page, a transcript) that includes one or more human natural language characters, such as English words, sentences, real numbers, symbols (e.g., %, $, &) or the like. For example, in some embodiments, a corpus of text is a meeting transcript that includes natural language characters indicating content spoken in a meeting (e.g., via speech-to-text functionality). In another example, the corpus of text includes a file or one or more messages (e.g., a communications message, such as a SMS text message, a chat message, an email message). In an illustrative example of block 702, a machine learning model or separate program module can receive or generate such corpus of text.

Per block 704, some embodiments determine contextual data associated with the corpus of text. "contextual data" as described herein refers to metadata or any other suitable data that is related to the corpus of text. For example, contextual data can refer to natural language words inside emails, chats, SMS texts, files, or the like, that refer to other words or entities within the corpus of text. For example, a meeting transcript (the corpus of text) may describe, in natural language, the "Red Sea" project. Contextual data may be any other sentences, entities, or concepts from emails, chats, SMS texts, files or the like that reference the Red Sea project, such as due date for the Red Sea project, names of people on the project, meeting dates where the project was discussed, emails that discuss the project, action items associated with the project, sales figures associated with the project, and the like. In some embodiments, the contextual data determiner 154 performs block 704, as described herein.

In an illustrative example of block 704, some embodiments determine metadata associated with a meeting, where the metadata includes at least one of: attendees of the meeting (e.g., the names of attendees), date of the meeting, and agenda associated with the meeting. Examples of this are described with respect to the contextual data determiner 154. In another example, some embodiments identify a network graph (or user profile) of a person who authored or commented about a file (e.g., mentioned the file name or file in an email as determined via NLP) or other corpus of text. Examples of this are described with respect to FIG. 6, where, for example, it is determined that John Doe and Jane Doe generated or otherwise interacted with Document A via the nodes 606, 604, and 602. In another example, some embodiments determine a file name (e.g., a name that a user saves the file as) or file type (e.g., PDF, WORD, EXCEL, etc.). In yet another example, some embodiments determine a date that a message was sent (e.g., via doing a computer of a message log), determining a recipient or sender of the message, or determining an attachment associated with the message (e.g., via scanning an attachment name in an email, opening and copying, from an email, the attachment and its contents).

Per block 706, based on the contextual data, some embodiments determine a corpus data supplement. In some embodiments, block 706 is performed by the processes 800 or 900 of FIG. 8 or FIG. 9 respectively. In some embodiments, a "corpus data supplement" is data to be added within the corpus of text, where the corpus of text is input into a machine learning model or language model. "Data to be added" in means that the data was not in the original corpus of text, but rather such data has been appended to or embedded into the original corpus of text sometime after it has been generated. Alternatively or additionally, in some embodiments, the "corpus data supplement" is data to be supplemented with the corpus of text (but not embedded into or added to the corpus of text itself). For example, a corpus data supplement can be an SMS or chat message, an email, or other piece of data that is separately provided as input, along with the corpus of text as input into a model.

In some embodiments, the corpus data supplement is a selected subset of contextual data, from a larger set of contextual data determined at block 704. In some embodiments, the corpus data supplement is reformatted or otherwise restructured relative to the contextual data. For example, the corpus data supplement can include tags or other data structures that add entity data (e.g., via NER) or can reduce the content relative to the contextual data, via text summarization techniques. Text summarization is the process of distilling the most important information from a source (or sources) to produce an abridged version for a particular user (or users) and task (or tasks). In some embodiments, Text summarization is performed using deep learning, such as Sequence-to-sequence RNNs, Pointer-Generator Networks, BERT, or the like. In some embodiments, the corpus data supplement comprises only a portion of entire set of the contextual data. In some embodiments, the corpus data supplement includes entity data enrichment data that is any data associated with an entity, such as the name of an entity itself, as described, for example, regarding any entities of the tags in FIG. 5 (e.g., document, date, supervising manager, action, etc.).

In some embodiments, block 706 includes selecting or determining a portion (e.g., a particular quantity of tokens, data sources, or the like) of the contextual data to be included in the corpus data supplement based on relevance of the contextual data and/or an input size constraint of the machine learning model, as described herein. For example, if a model only has the capacity to ingest 1405 tokens, particular embodiments feed the model contextual data from the highest ranked—or most relevant—to the lowest ranked—the least relevant-until the 1405 token threshold is met. With respect to "relevance," this can refer to the value, importance, cost, or economical considerations of incorporating particular contextual data as a corpus data supplement. For example, when a certain meeting transcript and/or user question contains certain natural language characters, such as a particular project name, a date, or other entity, such natural language characters (or semantically similar natural language characters) and their immediately surrounding context (e.g., words within a threshold distance) are elevated as valuable or relevant and are thus ranked higher than those natural language characters that are not the particular project name, the date, or entity. In another example, when using a network graph, for example, if a user asks a question, where the corpus of text is a meeting transcript, particular embodiments select nodes (e.g., representing particular strings, files, documents, etc.) within a threshold distance to the node representing the particular meeting transcript. Subsequently, based on being within such distance threshold, such nodes (or natural language characters within the data sources representing the nodes) are selected to be corpus data supplements. Accordingly, condensing the contextual data to minimize token consumption can be based on both relevance of the contextual data and/or input size constraints of the model.

Continuing with FIG. 7, per block 708, based on the determining of the corpus data supplement, some embodiments provide the corpus of text and the corpus data supplement (which may be included within the corpus of text) as input into a machine learning model. Examples of this are described with respect to the inputs 301 of FIG. 3 and/or the deployment inputs 403 of FIG. 4. In some embodiments, subsequent to the determining of the corpus data supplement, a user query (e.g., the user question 203 of FIG. 2; or the question in search field 515 of FIG. 5) is received. Accordingly, in some embodiments, the user query is also provided as input into the machine learning model (e.g., automatically and in response to the receiving of the user query). In an illustrative example of block 708, some embodiments transmit, via TCP/IP over a computer network to a service hosting the machine learning model, the corpus of text and the corpus data supplement to a network device that hosts the machine learning model, which then feeds the data to the model. In another example, a module simply returns or passes this data to another module stored to the same host (without transmitting over a computer network). Block 708 can also include otherwise causing the corpus of text and the corpus data supplement to be used as input into the machine learning model, such as contacting various intermediate services that ultimately instruct such machine learning model to process the inputs.

In some embodiments, the machine learning model is a Large Language Model (LLM). A language model is a statistical and probabilistic tool which determines the probability of a given sequence of words occurring in a sentence (e.g., via NSP or MLM). Simply put, it is a tool which is trained to predict the next word in a sentence. A language model is called a large language model when it is trained on enormous amount of data. Some examples of LLMs are GOOGLE's BERT and OpenAI's GPT-2 and GPT-3. GPT-3, which is the largest language model with 175 billion parameters trained on 570 gigabytes of text. These models have capabilities ranging from writing a simple essay to generating complex computer codes-all with limited to no supervision. Accordingly, an LLM is a deep neural network that is very large (billions to hundreds of billions of parameters) and understands, processes, and produces human natural language by being trained on massive amounts of text. These models can predict future words in a sentence letting them generate sentences similar to how humans talk and write. In some embodiments, the LLM is pre-trained (e.g., via NSP and MLM on a natural language corpus to learn English) without having been fine-tuned.

In some embodiments, in response to receiving a query, a corpus of text and the corpus data supplement is scanned. For example, each word of the corpus of text is extracted (e.g., TF-IDF) in order to execute the query by returning one or more search results for the query. For example, if a query includes the phrase "when is Red Sea due?" a model may tokenize and parse the query to determine that this is a question (based on POS tagging and syntactic analysis) about when a project is due based on sematic analysis of "Red Sea," where the corpus data supplement indicates Red Sea is a project name instead of a body of water. Accordingly, higher ranked search results may be due dates of relevant work projects, and lower or non-ranked search results may be search results concerning Red Sea as a body of water.

In some embodiments, based on the corpus of text and the corpus data supplement being used as input into the machine learning model, one or more different predictions can be made, as illustrated by the inference predictions 409 of FIG. 4. For example, one or more of the following can be provided as output: sentiment analysis, answering one or more questions, automatic summarization, text generation, machine translation, or document classification, or any other suitable model task. Sentiment analysis is the use of NLP for analyzing digital text to determine if the emotional tone of the message is positive, negative, or neutral. Automatic summarization (or text summarization) is the process of NLP text summarization is the process of breaking down text (e.g., several paragraphs) into smaller text (e.g., one sentence or paragraph). This method extracts vital information while also preserving the meaning of the text. This reduces the time required for grasping lengthy pieces such as articles without losing vital information. Text generation is the process of generating human natural language text with the goal of appearing indistinguishable to human-written text. In some embodiments, this is done via NSP or MLM. Machine translation is the process of using machine learning to automatically translate text from one language to another without human involvement. Modern machine translation goes beyond simple word-to-word translation to communicate the full meaning of the original language text in the target language. It analyzes all text elements and recognizes how the words influence one another. Document classification is a process that involves assigning a document to one or more categories (e.g., novel, depending on its content.

Figure 8:
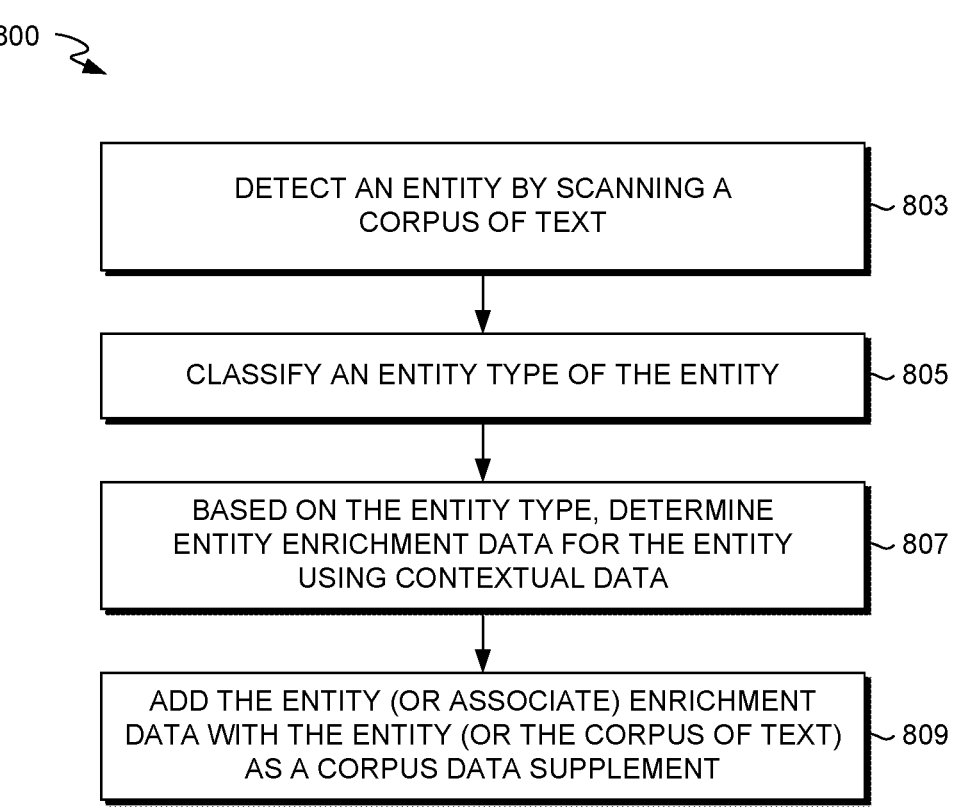
FIG. 8 is a flow diagram of an example process for generating a corpus data supplement, according to some embodiments.

FIG. 8 is a flow diagram of an example process 800 for generating a corpus data supplement, according to some embodiments. Per block 803, some embodiments detect an entity by scanning a corpus of text. In some embodiments, block 803 is done be performing Named Entity Recognition (NER) (also referred to as entity extraction). NER is an information extraction technique in NLP that identifies and classifies elements or "entities" (e.g., nouns) in natural language text into predefined categories. Such predefined categories may be indicated in corresponding tags or labels. Entities can be, for example, names of people, specific organizations, specific locations, specific times, specific quantities, specific monetary price values, specific percentages, specific pages, and the like. Likewise, the corresponding tags or labels can be specific people, organizations, location, time, price (or other invoice data) and the like. For example, some embodiments first tag the natural language characters within the corpus of text with POS tags, detects the boundaries of sentence, use capitalization rules and co-reference to use and find more specific terms. In some embodiments, the NER is performed using a deep learning model. In other embodiments, NER is lexicon or rule-based. It is understood that although only one entity is detected in block 803, multiple entities can be detected in the corpus of text and that the rest of the blocks 805, 807, and 809 apply to each of the multiple entities detected.

FIG. 8 and FIG. 9 described the concept of tagging an entity name (e.g., Red Sea) in the corpus of text with supplemental information (corpus data supplements) indicating information associated with the entity name, such as definition of the entity. In particular, in some embodiments, occurrences of entities in the corpus in the corpus of text are identified and classified based on the entity type. A determination is then made whether to provide contextual data (as entity data enrichment) for the entity, such as by tagging or inserting the supplemental information about the entity into the corpus of text. The determination may be based on the relevance of the entity to the transcript or other contextual data and/or based on the size of the corpus of text and the number of other entity data enrichments so as to satisfy the model input size constraints.

Per block 805, some embodiments classify an entity type of the entity. In some embodiments, block 805 is a part of NER. For example, in the sentence "I talked to Jack yesterday," the entity detected may be "Jack" (block 803), and the entity type can be "person" or "name." Other entity type examples includes object, place, location, person, organization, date, time, percentage, monetary value, or the like. Examples of entity types include: people (e.g., organization charts, team membership, user profile data), project data (e.g., project timelines, project goals), meetings/events (e.g., agendas, dates, attendees), and organization terms and abbreviations (e.g., description of the term or abbreviation).

Per block 807, based on the entity type, some embodiments determine entity enrichment data for the entity using contextual data. For example, for a "person" tag, some embodiments tag the entity name with a description of their role or project team membership. In other words, the "person" tag is used as signal when selecting what contextual data to use for making additional tags. For instance using the illustration above, for the sentence, "I talked to Jack yesterday," the "person" tag may be supplemented with an additional tag that states "first line manager of X business unit," which indicates that Jack is a first line manager of a particular business unit. In some embodiments, "entity enrichment data" (e.g., description of role or project team membership) is included in a corpus data supplement (or is the corpus data supplement itself). In some embodiments "entity enrichment data" includes all data that describes a particular entity in NER. For example, using the illustration above, the text "first line manager of X business unit" is the entity enrichment data.

Per block 809, some embodiments add the entity enrichment data with the entity as a corpus data supplement. Examples of this are described with respect to FIG. 5. For example, regarding tag 504, the entity enrichment data "the sales report document saved as 'Sales_Report_3.31.2023'" is added as a value next to the entity "document" (the entity or key). Some embodiments "associate" the entity enrichment data with the corpus of text as a corpus data supplement. For example, using FIG. 5 above, instead of embedding the tag 504 within the meeting transcript 502, some embodiments provide the information within the tag 504 as a separate document or message together with the corpus of text.

FIG. 9 is a flow diagram of an example process 900 for generating a corpus data supplement, according to some embodiments. In FIG. 9, a determination is made as to whether and to what extent each entity is enriched with an entity data enrichment. Per block 902, some embodiments detect a plurality of entities by scanning or corpus of text. In some embodiments, this is performed using NER or other NLP process. For example, each names mentioned in a meeting transcript are detected.

Perblock 904, some embodiments score each entity based on relevance of the entity to the contextual data. For instance, the higher the relevant an entity to the contextual data, the higher the score. For example, a sentence might read, "before I complete the task, I have to pick up my daughter." The word "task" is scored higher (e.g., score=0.90) than the person entity "daughter" (e.g., score=0.20) because associated emails may describe, in natural language, the task, which may be an action item and relevant for a current meeting, whereas the daughter is not relevant because it is not discussed in any emails, chats, documents, or other files. Per block 906, some embodiments rank each entity based on the score. For example, the "task" entity may be ranked higher than the person "daughter" entity. The rank is directly proportional to the score.

Based on the rank and for each entity, blocks 910, 912, and 914 are performed. For example, starting with the highest scoring entities or only those entities that have a score above a threshold (e.g., a predetermined score threshold or predetermined entity count threshold) these blocks are performed. Per block 910, some embodiments determine an entity type, such as via NER. Perblock 912, some embodiments determine whether to enrich the entity based on the entity type and a size of: the corpus of text, a portion of contextual data (if there is one), and/or a previously determined data enrichment.

In an illustrative example, only certain types of entities (e.g., names, projects, dates) may be selected for enrichment, whereas others (e.g., monetary values) are not selected for data enrichment. In another example, the larger the corpus of text or more words/entities contained in the corpus of text, the less likely an enrichment will occur because enough context may be available in the corpus of text. Likewise, the more contextual data is relevant to or associated with the entity, the more likely an enrichment will be selected for enrichment (e.g., especially if such contextual data is not within the corpus of text already) for that entity. For example, for a meeting transcript that indicates project X, those contextual data sets, such as emails, chats, and the like that include words that match the project X name, it is determined to enrich the entity with those data sets (e.g., the whole email message or a text summarization message (via deep learning) that indicates other relevant entities, such as due date of the project X). In yet another example, if a particular entity is a repeat entity (the same word or phrase is mentioned multiple times), and a data enrichment has already been determined, then there will be no need to create another data enrichment.

Per block 914, if the entity is to not be enriched, the process 900 continues from blocks 910, 912, and 914 for a different detected. Per block 916, if the entity is to be enriched at block 914, particular embodiments determine an entity data enrichment based on the contextual data, where the entity data enrichment is included in a corpus data supplement. For example, using the illustration above, the project X entity can be additionally tagged with a due date of the project, as found in an email message. In various embodiments, the entity data enrichment can be determined based on programmatic rules, a model (e.g., that performs text summarization or generation of a tag), or other logic. In some embodiments, block 916 (or the entire process 700) is a part of block 706 of FIG. 7.

Per block 920, some embodiments generate an enriched input for a model (e.g., a language model or machine learning model) comprising the corpus of text and the corpus data supplement. In some embodiments, block 920 includes or is the same as block 708 of FIG. 7.

Embodiments of the disclosure may be described in the general context of computer code or machine-useable instructions, including computer-useable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

OTHER EMBODIMENTS

In some embodiments, a computerized system, such as the computerized system described in any of the embodiments herein, comprise at least one computer processor, one or more computer storage media storing computer-useable instructions that, when used by the at least one computer processor, cause the at least one computer processor to perform operations comprising: receiving a corpus of text; determining contextual data associated with the corpus of text; based on the contextual data, determining a corpus data supplement, the corpus data supplement being at least one of: data to be added within the corpus of text as input into a trained machine learning model or data that supplements the corpus of text as input into the trained machine learning model; based on the determining of the corpus data supplement, providing the corpus of text and the corpus data supplement as input into the trained machine learning model; and based on the providing of the corpus of text and the corpus data supplement as input into the trained machine learning model, causing the machine learning model to perform an output.

Advantageously, these and other embodiments of the computerized system, as described herein, have the technical effects of improved accuracy scores or predictions (e.g., a confidence level answer, a clustering score, a classifier score, or generative text) relative to existing technologies and models, and reduced computer resource consumption. For example, various computer resource consumption technical effects as described herein are reduced computer memory, reduced latency, and reduced I/O.

In any combination of the above embodiments of the computerized system, the corpus of text includes a meeting transcript that includes natural language characters indicating content spoken in a meeting, and wherein the determining of the contextual data comprises: determining metadata associated with the meeting, and wherein the metadata includes at least one of: attendees of the meeting, date of the meeting, and agenda of the meeting.

In any combination of the above embodiments of the computerized system, the corpus of text includes a file, and wherein the determining of the contextual data comprises at least one of: identifying a network graph or user profile of a person who authored or commented about the file; and determining a file name or file type associated with the file.

In any combination of the above embodiments of the computerized system, the corpus of text includes one or more messages, and wherein the determining of the contextual data comprises at least one of: determining a date that a message was sent or received; determining a recipient or sender of the message; and determining an attachment associated with the message.

In any combination of the above embodiments of the computerized system, the determining of the corpus data supplement comprises: determining a first portion, among other portions, of the contextual data to be included in the corpus data supplement by determining contextual data from more relevant to less relevant until a token threshold is met, the token threshold corresponding to an input size constraint of the trained machine learning model, wherein the other portions are excluded from the corpus data supplement based on the token threshold having been met and being less relevant relative to the first portion.

In any combination of the above embodiments of the computerized system, the corpus data supplement comprises at least one of: a portion of the contextual data or entity data enrichment data that is data associated with an entity.

In any combination of the above embodiments of the computerized system, the determining of the corpus data supplement comprises: detecting an entity within the corpus of text by scanning the corpus of text; classifying the entity into an entity type; based on the entity type, determining entity data enrichment for the entity based on the contextual data; and adding or associating the entity data enrichment with the entity or the corpus of text as the corpus data supplement.

In any combination of the above embodiments of the computerized system, the determining of the corpus data supplement comprises: detecting a plurality of entities within the corpus of text; and scoring each entity, of the plurality of entities, according to a relevance of the entity to the contextual data.

In any combination of the above embodiments of the computerized system, the operations further comprise: for each entity, of the plurality of entities, whose score exceeds a relevance threshold: determining an entity type; determining whether to enrich the entity based on the entity type and a size of at least one of: the corpus of text, a portion of the contextual data, and an entity data enrichment; and based on determining to enrich the entity, determining an entity data enrichment data based on the contextual data, the entity data enrichment data being included in the corpus data supplement.

In any combination of the above embodiments of the computerized system, the operations further comprise: receiving or determining an input size constraint of the machine learning model, wherein the determining of the corpus data supplement is based on the input size constraint.

In any combination of the above embodiments of the computerized system, the output includes at least one of: sentiment analysis, answering one or more questions, automatic summarization, text generation, machine translation, or document classification.

In any combination of the above embodiments of the computerized system, the machine learning model is pre-trained without having been fine-tuned.

In any combination of the above embodiments of the computerized system, the operations further comprise: receiving a user query; in response to the receiving of the user query, scanning the corpus of text and the corpus data supplement; based on the scanning and the providing of the corpus of text and the corpus data supplement as input into the trained machine learning model, causing the query to be executed such that one or more results for the query are returned.

In some embodiments, a computer-implemented method, such as the computer-implemented described in any of the embodiments herein, comprises receiving a corpus of text; determining contextual data associated with the corpus of text; based on the contextual data, determining a corpus data supplement; subsequent to the determining of the corpus data supplement, receiving a user query; in response to the receiving of the user query, providing the user query, the corpus of text, and the corpus data supplement as input into a machine learning model; and based on the providing, causing the user query to be executed such that one or more results for the query are returned.

Advantageously, these and other embodiments of the computer-implemented method, as described herein, have the technical effects of improved accuracy scores or predictions (e.g., a confidence level answer, a clustering score, a classifier score, or generative text) relative to existing technologies and models, and reduced computer resource consumption. For example, various computer resource consumption technical effects as described herein are reduced computer memory, reduced latency, and reduced I/O.

In any combination of the above embodiments of the computer-implemented method, the corpus of text includes at least one of: a set of chat messages or a meeting transcript that includes natural language characters indicating content spoken during a meeting, and wherein the determining of the contextual data comprises: determining metadata associated with the meeting or the set of chats and wherein the metadata includes at least one of: attendees of the meeting, date of the meeting, agenda of the meeting, participants in a chat session associated with the set of chat messages, and a date that the chat messages were sent.

In any combination of the above embodiments of the computer-implemented method, the determining of the corpus data supplement comprises: detecting an entity within the corpus of text; classifying the entity into an entity type; based on the entity type, determining entity data enrichment for the entity based on the contextual data; and adding or associating the entity data enrichment with the entity or the corpus of text as the corpus data supplement.

In any combination of the above embodiments of the computer-implemented method, the determining of the corpus data supplement comprises: detecting a plurality of entities within the corpus of text by scanning the corpus of text; scoring each entity, of the plurality of entities, according to a relevance of the entity to the contextual data; ranking each entity, of the plurality of entities, based on the score; for each entity, of the plurality of entities: based on the ranking, determining an entity type; determining whether to enrich the entity based on the entity type and a size of at least one of: the corpus of text, a portion of the contextual data, and an entity data enrichment; and based on determining to enrich the entity, determining an entity data enrichment data based on the contextual data, the entity data enrichment data being included in the corpus data supplement.

In any combination of the above embodiments of the computer-implemented method, the machine learning model is pre-trained without having been fine-tuned.

In some embodiments, one or more computer storage media, such as any of the computer storage media described in any of the embodiments herein, comprises computer-executable instructions embodied thereon that, when executed, by one or more processors, cause the one or more processors to perform operations comprising: receiving a corpus of text; determining contextual data associated with the corpus of text; based on the contextual data, determining a corpus data supplement, the corpus data supplement being at least one of: data to be added within the corpus of text or data to be supplemented with the corpus of text as input into a language model; and based on the determining of the corpus data supplement, causing the corpus of text and the corpus data supplement to be used as input into the language model.

Advantageously, these and other embodiments of the one or more computer storage media, as described herein, have the technical effects of improved accuracy scores or predictions (e.g., a confidence level answer, a clustering score, a classifier score, or generative text) relative to existing technologies and models, and reduced computer resource consumption. For example, various computer resource consumption technical effects as described herein are reduced computer memory, reduced latency, and reduced I/O.

In any combination of the above embodiments of the one or more computer storage media, the operations further comprising: based on the corpus of text and the corpus data supplement being used as input into the language model, causing the language model to perform at least one of: sentiment analysis, answering one or more questions, automatic summarization, text generation, machine translation, or document classification.

Example Computing Architecture and Device

Figure 10:
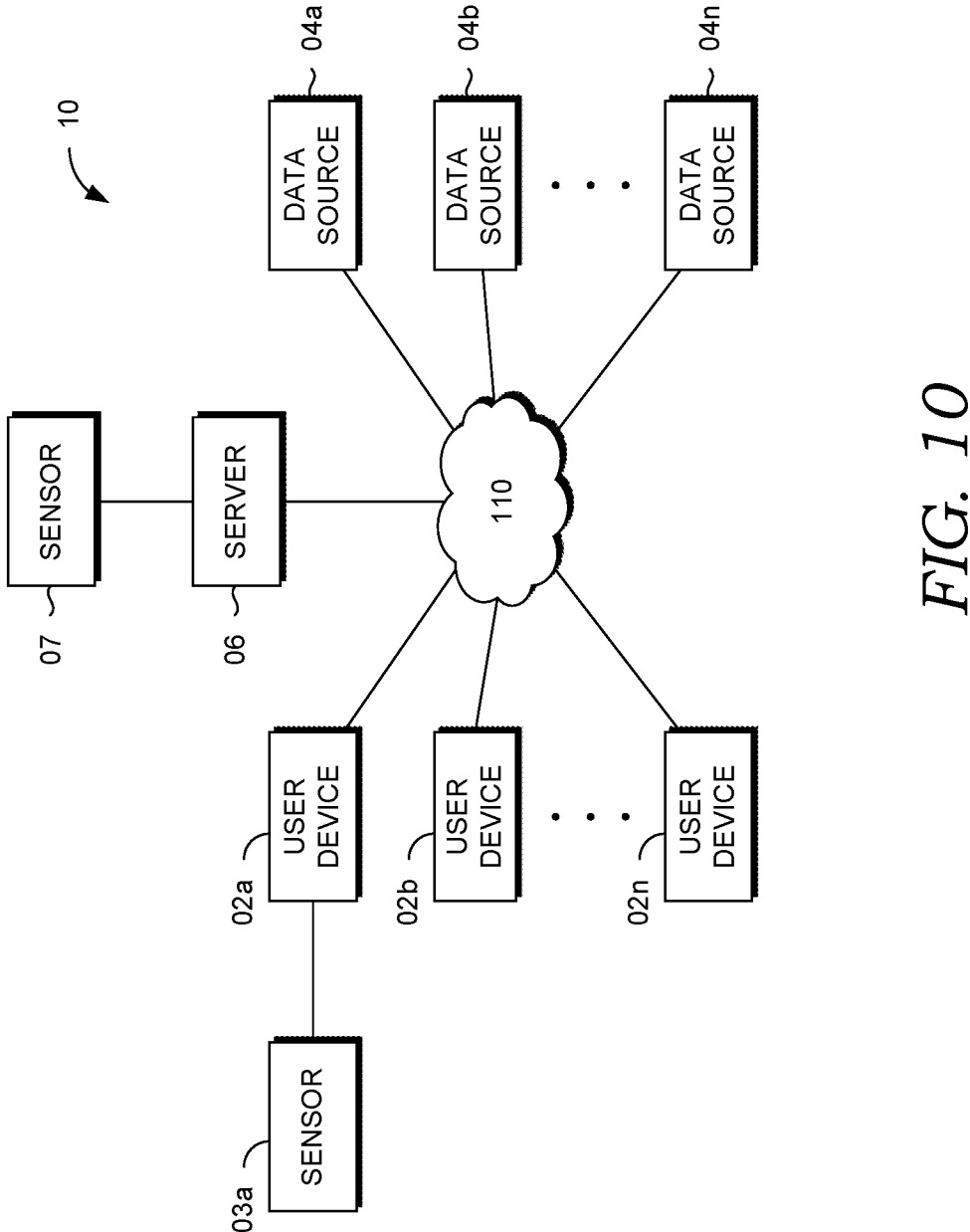
FIG. 10 is a block diagram illustrating an example operating environment suitable for implementing some embodiments of the disclosure.

Turning now to FIG. 10, a block diagram is provided showing an example operating environment 10 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 10 includes a number of user devices, such as user devices 02a and 02b through 02n; a number of data sources (for example, databases or other data stores, such as 105), such as data sources 04a and 04b through 04n; server 06; sensors 03a and 07; and network(s) 110. It should be understood that environment 10 shown in FIG. 10 is an example of one suitable operating environment. Each of the components shown in FIG. 10 may be implemented via any type of computing device, such as computing device 11 as described in connection to FIG. 11, for example. These components may communicate with each other via network(s) 110, which may include, without limitation, a local area network (LAN) and/or a wide area networks (WAN). In some implementations, network(s) 110 comprises the Internet and/or a cellular network, amongst any of a variety of possible public and/or private networks.

It should be understood that any number of user devices, servers, and data sources may be employed within operating environment 10 within the scope of the present disclosure. Each may comprise a single device or multiple devices cooperating in a distributed environment. For instance, server 06 may be provided via multiple devices arranged in a distributed environment that collectively provide the functionality described herein. Additionally, other components not shown may also be included within the distributed environment.

User devices 02a and 02b through 02n can be client devices on the client-side of operating environment 10, while server 06 can be on the server-side of operating environment 10. Server 06 can comprise server-side software designed to work in conjunction with client-side software on user devices 02a and 02b through 02n so as to implement any combination of the features and functionalities discussed in the present disclosure. This division of operating environment 10 is provided to illustrate one example of a suitable environment, and there is no requirement for each implementation that any combination of server 06 and user devices 02a and 02b through 02n remain as separate entities. In some embodiments, the one or more servers 06 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the one or more network(s) 110.

In some embodiments, a user device 02a or server 06 alternatively or additionally comprises one or more web servers and/or application servers to facilitate delivering web or online content to browsers installed on a user device 02b. Often the content may include static content and dynamic content. When a client application, such as a web browser, requests a website or web application via a URL or search term, the browser typically contacts a web server to request static content or the basic components of a website or web application (for example, HTML pages, image files, video files, and the like). Application servers typically deliver any dynamic portions of web applications or business logic portions of web applications. Business logic can be described as functionality that manages communication between a user device and a data store (for example, a database). Such functionality can include business rules or workflows (for example, code that indicates conditional if/then statements, while statements, and the like to denote an order of processes).

User devices 02a and 02b through 02n may comprise any type of computing device capable of use by a user. For example, in one embodiment, user devices 02a through 02n may be the type of computing device described in relation to FIG. 11 herein. By way of example and not limitation, a user device may be embodied as a personal computer (PC), a laptop computer, a mobile phone or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 04a and 04b through 04n may comprise data sources and/or data systems, which are configured to make data available to any of the various constituents of operating environment 10 or system 100 described in connection to FIG. 1. Examples of data source(s) 04a through 04n may be one or more of a database, a file, data structure, corpus, or other data store. Data sources 04a and 04b through 04n may be discrete from user devices 02a and 02b through 02n and server 06 or may be incorporated and/or integrated into at least one of those components. In one embodiment, data sources 04a through 04n comprise sensors (such as sensors 03a and 07), which may be integrated into or associated with the user device(s) 02a, 02b, or 02n or server 06.

In some embodiments, operating environment 10 is utilized to implement one or more of the components of the system 100, described in FIG. 1, including components for generating a score indicating whether a same user accessed multiple sessions, as described herein. Operating environment 10 also can be utilized for implementing aspects of processes 800 (FIG. 8), 900 (FIG. 9) and/or any other functionality as described in connection with FIGS. 1-9.

Figure 11:
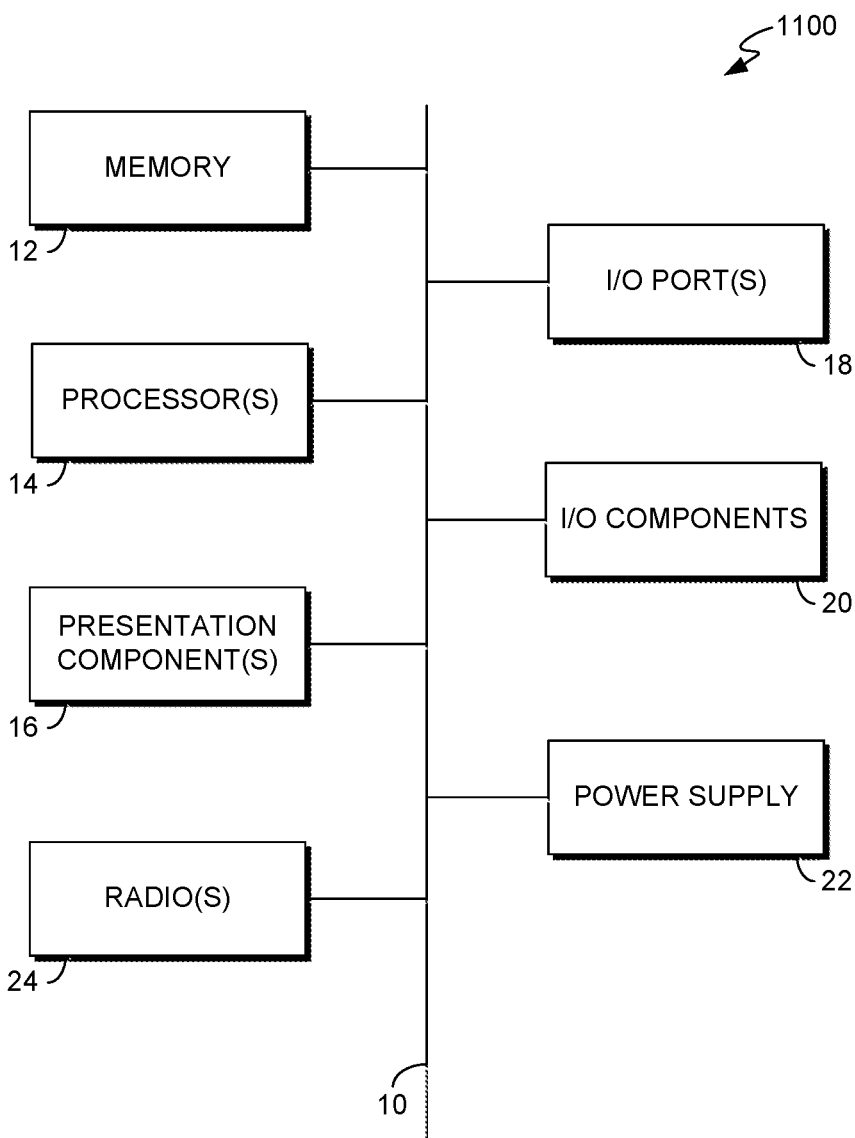
FIG. 11 is a block diagram of an example computing device suitable for use in implementing some embodiments described herein.

Having described various implementations, an exemplary computing environment suitable for implementing embodiments of the disclosure is now described. With reference to FIG. 11, an exemplary computing device is provided and referred to generally as computing device 11. The computing device 11 is but one example of a suitable computing environment and is not intended to suggest any limitation as to the scope of use or functionality of embodiments of the disclosure. Neither should the computing device 11 be interpreted as having any dependency or requirement relating to any one or combination of components illustrated.

Turning to FIG. 11, computing device 11 includes a bus 19 that directly or indirectly couples the following devices: memory 12, one or more processors 14, one or more presentation components 16, one or more input/output (I/O) ports 18, one or more I/O components 20, and an illustrative power supply 22. Bus 19 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 11 and with reference to "computing device."

Computing device 11 typically includes a variety of computer-readable media. Computer-readable media can be any available media that can be accessed by computing device 11 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 11. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 11 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 11 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 11. The computing device 11 may be equipped with depth cameras, such as stereoscopic camera systems, infrared camera systems, RGB camera systems, and combinations of these, for gesture detection and recognition. Additionally, the computing device 11 may be equipped with accelerometers or gyroscopes that enable detection of motion. The output of the accelerometers or gyroscopes may be provided to the display of the computing device 11 to render immersive augmented reality or virtual reality.

Some embodiments of computing device 11 may include one or more radio(s) 24 (or similar wireless communication components). The radio 24 transmits and receives radio or wireless communications. The computing device 11 may be a wireless terminal adapted to receive communications and media over various wireless networks. Computing device 11 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (for example, mobile hotspot) that provides access to a wireless communications network, such as a WLAN connection using the 802.11 protocol, a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions, and the like.) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

As used herein, the term "set" may be employed to refer to an ordered (i.e., sequential) or an unordered (i.e., non-sequential) collection of objects (or elements), such as but not limited to data elements (for example, events, clusters of events, and the like). A set may include N elements, where N is any non-negative integer. That is, a set may include 1, 2, 3, . . . . N objects and/or elements, where N is an positive integer with no upper bound. Therefore, as used herein, a set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

The invention claimed is:

1. A system comprising:
at least one computer processor; and
one or more computer storage media storing computer-useable instructions that, when used by the at least one computer processor, cause the at least one computer processor to perform operations comprising:
receiving a corpus of text;
determining contextual data associated with the corpus of text;
based on the contextual data, determining a corpus data supplement, the corpus data supplement being at least one of: data to be added within the corpus of text as input into a trained machine learning model or data that supplements the corpus of text as input into the trained machine learning model, wherein determining the corpus data supplement comprises determining a first portion, among other portions, of the contextual data to be included in the corpus data supplement by determining contextual data from more relevant to less relevant until a token threshold is met, the token threshold corresponding to an input size constraint of the trained machine learning model, wherein the other portions are excluded from the corpus data supplement based on the token threshold having been met and being less relevant relative to the first portion;
based on the determining of the corpus data supplement, providing the corpus of text and the corpus data supplement as input into the trained machine learning model; and
based on the providing of the corpus of text and the corpus data supplement as input into the trained machine learning model, causing the machine learning model to perform an output that is based on the corpus data supplement.

2. The system of claim 1, wherein the corpus of text includes a meeting transcript that includes natural language characters indicating content spoken in a meeting, and wherein the determining of the contextual data comprises:

determining metadata associated with the meeting, and wherein the metadata includes at least one of: attendees of the meeting, date of the meeting, and agenda of the meeting.

3. The system of claim 1, wherein the corpus of text includes a file, and wherein the determining of the contextual data comprises at least one of:
identifying a network graph or user profile of a person who authored or commented about the file; and
determining a file name or file type associated with the file.

4. The system of claim 1, wherein the corpus of text includes one or more messages, and wherein the determining of the contextual data comprises at least one of:
determining a date that a message was sent or received;
determining a recipient or sender of the message; and
determining an attachment associated with the message.

5. The system of claim 1, wherein the corpus data supplement comprises at least one of: a portion of the contextual data or entity data enrichment data that is data associated with an entity.

6. The system of claim 1, wherein the determining of the corpus data supplement comprises:
detecting an entity within the corpus of text by scanning the corpus of text;
classifying the entity into an entity type;
based on the entity type, determining entity data enrichment for the entity based on the contextual data; and
adding or associating the entity data enrichment with the entity or the corpus of text as the corpus data supplement.

7. The system of claim 1, wherein the determining of the corpus data supplement comprises:
detecting a plurality of entities within the corpus of text; and
scoring each entity, of the plurality of entities, according to a relevance of the entity to the contextual data.

8. The system of claim 7, wherein the operations further comprise:
for each entity, of the plurality of entities, whose score exceeds a relevance threshold:
determining an entity type;
determining whether to enrich the entity based on the entity type and a size of at least one of: the corpus of text, a portion of the contextual data, and an entity data enrichment; and
based on determining to enrich the entity, determining an entity data enrichment data based on the contextual data, the entity data enrichment data being included in the corpus data supplement.

9. The system of claim 1, wherein the operations further comprise:
receiving or determining an input size constraint of the machine learning model, wherein the determining of the corpus data supplement is based on the input size constraint.

10. The system of claim 1, wherein the output includes at least one of: sentiment analysis, answering one or more questions, automatic summarization, text generation, machine translation, or document classification.

11. The system of claim 1, wherein the machine learning model is pre-trained without having been fine-tuned.

12. The system of claim 1, wherein the operations further comprise:
receiving a user query;
in response to the receiving of the user query, scanning the corpus of text and the corpus data supplement;

based on the scanning and the providing of the corpus of text and the corpus data supplement as input into the trained machine learning model, causing the query to be executed such that one or more results for the query are returned.

13. A computer-implemented method comprising:

receiving a corpus of text;

determining contextual data associated with the corpus of text, wherein determining the corpus data supplement comprises:

detecting a plurality of entities within the corpus of text by scanning the corpus of text;

scoring each entity of the plurality of entities according to a relevance of the entity to the contextual data;

ranking each entity of the plurality of entities based on the score; and for each entity of the plurality of entities:

based on the ranking, determining an entity type;

determining whether to enrich the entity based on the entity type and a size of at least one of: the corpus of text, a portion of the contextual data, or an entity data enrichment; and based on determining to enrich the entity, determining an entity data enrichment data based on the contextual data;

based on the contextual data, determining a corpus data supplement;

subsequent to the determining of the corpus data supplement, receiving a user query;

in response to the receiving of the user query, providing the user query, the corpus of text, and the corpus data supplement as input into a machine learning model; and based on the providing, causing the user query to be executed such that one or more results for the query are returned, wherein the one or more results are based at least on the corpus data supplement.

14. The computer-implemented method of claim 13, wherein the corpus of text includes at least one of: a set of chat messages or a meeting transcript that includes natural language characters indicating content spoken during a meeting, and wherein the determining of the contextual data comprises:

determining metadata associated with the meeting or the set of chats and wherein the metadata includes at least one of: attendees of the meeting, date of the meeting, agenda of the meeting, participants in a chat session associated with the set of chat messages, and a date that the chat messages were sent.

15. The computer-implemented method of claim 13, wherein the determining of the corpus data supplement comprises:

detecting an entity within the corpus of text;

classifying the entity into an entity type;

based on the entity type, determining entity data enrichment for the entity based on the contextual data; and adding or associating the entity data enrichment with the entity or the corpus of text as the corpus data supplement.

16. The computer-implemented method of claim 13, wherein the machine learning model is pre-trained without having been fine-tuned.

17. One or more computer storage media having computer-executable instructions embodied thereon that, when executed, by one or more processors, cause the one or more processors to perform operations comprising:

receiving a corpus of text;

determining contextual data associated with the corpus of text;

based on the contextual data, determining a corpus data supplement, the corpus data supplement being at least one of: data to be added within the corpus of text or data to be supplemented with the corpus of text as input into a language model, wherein determining the corpus data supplement comprises determining a first portion, among other portions, of the contextual data to be included in the corpus data supplement by determining contextual data from more relevant to less relevant until a token threshold is met, the token threshold corresponding to an input size constraint of the trained machine learning model, wherein the other portions are excluded from the corpus data supplement based on the token threshold having been met and being less relevant relative to the first portion;

based on the determining of the corpus data supplement, causing the corpus of text and the corpus data supplement to be used as input into the language model; and receiving, from the language model, an output that is based on the corpus data supplement.

18. The one or more computer storage media of claim 17, wherein the operations further comprising:

based on the corpus of text and the corpus data supplement being used as input into the language model, causing the language model to perform at least one of: sentiment analysis, answering one or more questions, automatic summarization, text generation, machine translation, or document classification.

19. The one or more computer storage media of claim 17, wherein the corpus of text includes a meeting transcript that includes natural language characters indicating content spoken in a meeting.

20. The one or more computer storage media of claim 19, wherein the determining of the contextual data comprises:

determining metadata associated with the meeting, wherein the metadata includes at least one of: attendees of the meeting, a date of the meeting, or an agenda of the meeting.

* * * * *